(12) United States Patent
Nakamura et al.

(10) Patent No.: US 6,620,466 B2
(45) Date of Patent: Sep. 16, 2003

(54) DISPLAY DEVICE AND AN ELECTRO-OPTICAL DEVICE USING A COLLOIDAL LIQUID CRYSTAL COMPOSITE

(75) Inventors: Hajime Nakamura, Yokohama (JP); Jason Crain, Edinburgh (GB)

(73) Assignee: International Business Machines Corporation, Armonk, NY (US)

( * ) Notice: Subject to any disclaimer, the term of this patent is extended or adjusted under 35 U.S.C. 154(b) by 149 days.

(21) Appl. No.: 09/840,970

(22) Filed: Apr. 25, 2001

(65) Prior Publication Data

US 2001/0035918 A1 Nov. 1, 2001

(30) Foreign Application Priority Data

Apr. 26, 2000 (JP) .................................. 2000-126453

(51) Int. Cl.[7] ........................ C09K 19/52; C09K 19/00
(52) U.S. Cl. ................. 428/1.1; 252/299.01; 252/299.6
(58) Field of Search ...................... 428/1.1; 252/299.01, 252/299.2, 299.3, 299.5, 299.6, 299.7

(56) References Cited

U.S. PATENT DOCUMENTS

| | | | | |
|---|---|---|---|---|
| 5,077,347 A | * | 12/1991 | Yabuta et al. | ................. 524/504 |
| 5,530,566 A | * | 6/1996 | Kumar | .......................... 359/51 |
| 5,625,477 A | * | 4/1997 | Wu et al. | ...................... 349/35 |
| 5,956,113 A | | 9/1999 | Crawford | |
| 5,976,405 A | | 11/1999 | Clikeman et al. | |
| 6,046,791 A | * | 4/2000 | Kobayashi et al. | ............. 428/1 |

* cited by examiner

Primary Examiner—Mark F. Huff
Assistant Examiner—Jennifer R. Sadula
(74) Attorney, Agent, or Firm—Robert M. Trepp, Esq.; McGinn & Gibb, PLLC

(57) ABSTRACT

A liquid crystal display device and an electro-optical device include substrates facing each other and each having an electrode, the substrates being spaced apart, spacers disposed between the substrates and defining an electro-optical cell together with the substrates, and a colloidal liquid crystal composite (CLCC) formed in the electro-optical cell. The CLCC includes particle-rich inter-domain regions and micro-domains of a mesogenic liquid crystal, and the particle-rich inter-domain regions include colloidal organic particles being networked in the mesogenic liquid crystal.

38 Claims, 20 Drawing Sheets

(a)

(b)

(c)

DISPLAY DEVICE AND AN ELECTRO-OPTICAL DEVICE USING A COLLOIDAL LIQUID CRYSTAL COMPOSITE

BACKGROUND OF THE INVENTION

1. Field of the Invention

The present invention relates to a display device, and more particularly to a liquid crystal display device comprising a novel liquid crystal microstructure formed by a method controlling the microstructure, and a method for forming a novel colloidal liquid crystal composite (CLCC). The present invention also relates to a novel electro-optical device using the novel colloidal liquid crystal composite and a method for forming the electro-optical device.

2. Description of the Related Art

Recently, liquid crystals have been used in various applications and their role in the display field has become more and more important. The applications of the liquid crystals include, for example, computer display screens, wristwatches, architectural windows, privacy windows, automobile windows, automobile sunroofs, switching devices for optical systems, projection display devices, reflective display devices, hand-held paging devices, cellular phones, laptop computers, television screens including car-mounted television screens, automotive displays including radio, dashboard, and on-board navigation systems, helmet displays such as "heads-up" displays, cockpit displays, imaging devices, virtual reality devices, simulation devices, electronic gating devices, diffraction gratings, and calculators. The liquid crystal devices used in the above applications may be monochromatic or polychromatic.

Liquid crystal molecules have generally a rod-like or a disk-like shape, and their physical properties are intermediate those of a crystalline solid and those of an amorphous liquid. The liquid crystal molecules comprise, generally, substituted biphenyl or triphenyl functional groups, in which one of the phenyl groups is separated by a spacer group. Liquid crystal types include, for example, twisted nematic, super twisted nematic, cholesteric, ferroelectric liquid crystals. Liquid crystal devices (LCD) may be assembled by any of the liquid crystal types described above.

Alternatively, another type of display utilizing a liquid crystal dispersed within a polymer matrix in which the liquid crystals create micro-domains (i.e., a polymer dispersed liquid crystal display (PDLC) is known in the art. PDLCs are often used in the form of thin films less than about 200 $\mu$m in thickness, and typically from 2 $\mu$m to 50 $\mu$m. It is known that light transmittance of PDLCs varies with reflective indices of materials and the angle of the reflection varies with respect to both the wavelength of light and temperature.

Although liquid crystals exhibit excellent availability as a display device and an electro-optical device as described above, developments for the liquid crystals are still continued so as to improve their physical properties for overcoming some deficiencies. The conventional liquid crystal devices have a narrow viewing angle. In addition, conventional PDLCs have undesirably high switching voltage resulting in higher driving power, and require additional apparatus for production thereof, which incurs an additional production cost and capital investment.

Several conventional types of display devices and the electro-optical devices have been proposed in relation to liquid crystals having dual-domain structures.

Dual Domain Twisted Nematic Device

It is known that a viewing angle of the twisted nematic display device is asymmetric, and its contrast becomes poor when viewed at certain angles. Many attempts to overcome the above problem have been made by creating a dual-domain structure in the liquid crystal, in which the liquid crystal molecules are aligned with different directions in adjacent domains at each display pixel. The above structure has been realized by various techniques, all of which disadvantageously require an additional process to form two alignment surfaces.

FIG. 1 depicts a schematic cell structure having the above architecture and a schematic production process for obtaining the above structure. The structure shown in FIG. 1 is a dual-domain twisted nematic device whose pixel is made up of two subpixels. As shown in FIG. 1, the simplest way to obtain the above structure is by first rubbing alignment layers coated onto the substrate, patterning photolithographically such portions that need to be masked, rubbing the unmasked portion in a different direction, and then removing the mask pattern. Recently, a special photo-alignment material has become available and the alignment may be controlled by the polarization of irradiated light and any pattern can be created without the masking process, when the light is patterned (E. Hoffman et al. SID'98 Digest, p. 734, 1998).

The top and bottom substrates are positioned at a right-angled alignment, and the two subpixels have different tilt angles. The subpixels, therefore, have 90 degree twist structures with right and left handednesses. Due to the symmetry of the two twist structures, the pixel exhibits a symmetric viewing angle at any bias level, and hence the anisotropy of the viewing angle may be reduced.

However, the cost and time required for obtaining the dual domain structure described above by using these techniques hinder versatile commercialization.

Cholestric Texture Device

In addition to nematic liquid crystal technologies, there are other devices that take advantage of optical properties of cholesteric liquid crystals. Cholesteric liquid crystals show two states when sandwiched between two substrates (i.e. a planar state that exhibits reflection over a narrow band of wavelengths and a focal conic state which scatters light weakly). These two states are shown in FIGS. 2(a) and 2(b). Bi-stable director distributions respectively correspond to the planar state in FIG. 2(a) and a focal conic state in FIG. 2(b) in the cholesteric device. The bi-stable operation between these two states must be secured by either a polymer network formed in the liquid crystal or surface treatments. The former is called a "polymer-stabilized cholesteric texture" (D. K. Yang et. al., "Control of reflectivity and bistability in displays using cholesteric liquid crystals", J. Appl. Phys. Vol. 76, No. 2, pp.1331–1333) and devices based on these systems are known and marketed by Kent Display.

However, a drawback of this technique is that an additional UV curing process is required to obtain a polymer network. Recently a new kind of the cholesteric texture modes has been presented (U.S. Pat. No. 5,956,113 to G. P. Crawford et. al. incorporated herein by reference) in which a small amount of commercial inorganic silica particles is blended in a host cholesteric liquid crystal, and the aggregates of the particles due to the hydrogen bond develop network structure in the host.

The presence of molecular interaction between the particles and liquid crystal molecules may contribute to promote bi-stability of the device. This technique is prominent in its simple processabilty. However, there is no visible cellular morphology nor remark to the mechanical properties of the liquid crystal composites, or to whether such compositions are allowed to be poured and processed as typical liquid crystal materials. The low viscosity of the composite will limit processing conditions under which the layer of liquid crystal composites may be formed on the substrate.

White-Taylor Device

This device utilizes a small amount of dye compound dissolved in a host liquid crystal material and provides a reflective display (White and Taylor, J. Appl. Phys., Vol. 45, p. 4718, 1974). A typical construction of a White-Taylor device is shown in FIGS. 3(a) and 3(b). Usually, a White-Taylor device has a 300 degree twist configuration provided by a polyimide coating and a rubbing processes. In FIG. 3(a), light is absorbed in a bias-off state by the liquid crystals, whereas the incident light passes through in a bias-on the state in FIG. 3(b). The curved arrows in FIG. 3(a) indicate the helical structure of the molecules in the bias-off state. The device appears dark under the bias-off state because the molecular axes of dye molecules, which lie along the substrate surface, rotate almost a full turn, thereby maximizing the light absorption as shown in FIG. 3(a). When the bias voltage is applied to the device as shown in FIG. 3(b), the dye molecules are forced to align along with the electric field, thereby minimizing the light absorption of the molecules.

The voltage vs. transmittance curve of a typical White-Taylor device is shown in FIG. 4. The solid line shows the transmittance when a bias voltage is decreased and the dashed line shows the transmittance when the bias voltage is increased. The voltage vs. transmittance curve shown in FIG. 4 exhibits a sharp rise at about 2.5 V while the hysterisis on the response is observed. At this voltage, stripe domains start to grow and spread over the entire region for a few minutes. It is considered that the formation of the stripe domains also causes the hysteresis on the voltage vs. transmittance curves.

This device also works as a bi-stable device having substantial hysteresis. This problem may be overcome by using a specific alignment treatment called a-N*GH (T. Sugiyama et. al., "A reflective a-N*GH-LCD and its ergonomic characterization", SID'96 Digest, pp. 35–38, 1996), where a director angle is distributed randomly in the micro-domains. A cell is prepared by cooling down, after filling in a liquid crystal at a very slow rate. Therefore, the process requires a long processing time and precise temperature control, thereby incurring extra cost in the production process.

U.S. Pat. No. 5,976,405, incorporated herein by reference, discloses uniformly sized domains of liquid crystals surrounded by a polymer shell, which is also known as polymer-encased liquid crystals (PELCs). A display made using the PELCs exhibits markedly improved electro-optical performance. However, the cost and time required for obtaining the dual domain structure by using these techniques are also obstacles for versatile commercialization of the devices.

Therefore, a novel liquid crystal material having wide viewing angle and low switching voltage has been desired. In addition, a novel liquid crystal material, which allows a display device to be produced without incurring an additional production cost, has been requested.

Additionally, a novel liquid crystal material, which allows an opto-electric hysterisis to be controlled, has been desired. Further, a novel display device including such novel liquid crystal material and a novel electro-optical device (and a method for forming the same) have been desired. Hitherto the present invention, such desires and requests have not been met.

SUMMARY OF THE INVENTION

In view of the foregoing and other problems, disadvantages, and drawbacks of the conventional methods and structures, an object of the present invention is to provide a method and structure using a novel liquid crystal material.

Another object of the present invention is to provide a transmission or reflection type liquid crystal display device having controlled polydomain microstructures.

Another object of the present invention is to provide a liquid crystal display device for reducing the angle-dependence of the display's viewing angle for major device types including at least twisted-nematic, super-twisted-nematic, parallel nematic, cholesteric and White-Taylor architectures.

Yet another object of the present invention is to provide a liquid crystal display device which does not require further processing steps in device fabrication processes.

Still another object of the present invention is to provide a liquid crystal display device which allows hysteresis in electro-optical switching characteristics to be controlled.

Still another object of the present invention is to provide an electro-optical device comprising the above colloidal liquid crystal composite and a method for forming the same.

In a first aspect of the present invention, a display device includes substrates facing each other and each having an electrode, the substrates being spaced apart, spacers disposed between the substrates and defining an electro-optical cell together with the substrates, and a colloidal liquid crystal composite (CLCC) provided in the electro-optical cell, the CLCC comprising particle-rich inter-domain regions and micro-domains of a liquid crystal, the particle-rich inter-domain regions comprising colloidal organic particles being networked in the liquid crystal.

In a second aspect, a method of forming a liquid crystal microstructure according to the present invention includes providing colloidal organic particles, and mixing the colloidal organic particles with a liquid crystal so as to form micro-domains under a condition that the colloidal particles are introduced in an isotropic phase of the liquid crystal.

The inventors completed the present invention through work on CLCCs which provide advantages on the complete range of physical and optical properties of liquid crystals. The basic idea of the invention is widely applicable to controlling liquid crystal micro-structures in order to improve the optical performance of display devices and electro-optical devices.

A general principle of the present invention is that the naturally-occuring internal interfaces of the CLCC microstructure provide domain boundaries of controlled size depending on colloidal particle concentration. Moreover, a formation of the cellular microstructure may arise from partial phase separation of the particles driven by emerging nematic domains. These domains expel the colloidal particles for lowering an elastic distortion energy when passing through the isotropic-nematic transition point.

The present invention uses a network created by colloidal organic particles with a surface treatment which stabilizes and controls microstructures in liquid crystal (LC) materials, thereby improving optical and physical performances of the liquid crystal display device and the electro-optical device including the liquid crystals. The resulting colloidal liquid crystal composite is stabilized by the colloidal organic particles made from polymeric materials. Surfaces of the organic colloidal particles may be grafted with poly-12-hydroxystearic acid so as to sterically stabilize the colloidal particles. Incorporation of the colloidal particles into the liquid crystal may be achieved by heating the liquid crystal above its clearing points (i.e., clearing temperature) so as to ensure mixing between the organic colloidal particles and the liquid crystal over a cell region. Also, the present invention provides a method for forming a microstructure suitably utilized for a liquid crystal display.

The present disclosure relates to subject matter contained in Japanese Patent Application No. 2000-126453, filed Apr. 26, 2000, which is expressly incorporated herein by reference in its entirety.

BRIEF DESCRIPTION OF THE DRAWINGS

The foregoing and other purposes, aspects and advantages will be better understood from the following detailed description of a preferred embodiment of the invention with reference to the drawings, in which:

FIGS. 10(a) and 10(b) respectively show polarized microscopic images of polydomain structure in a TN cell with a CLCC of 2 wt % with bias voltage off and a bias voltage of 5V on;

FIGS. 13(a) and 13(b) respectively show polarized microscopic images of polydomain structure in a homogenous-aligned cell with a CLCC of 2 wt % with bias voltage off and bias voltage of 5V on;

DETAILED DESCRIPTION OF THE PREFERRED EMBODIMENTS OF THE INVENTION

Figure 1:
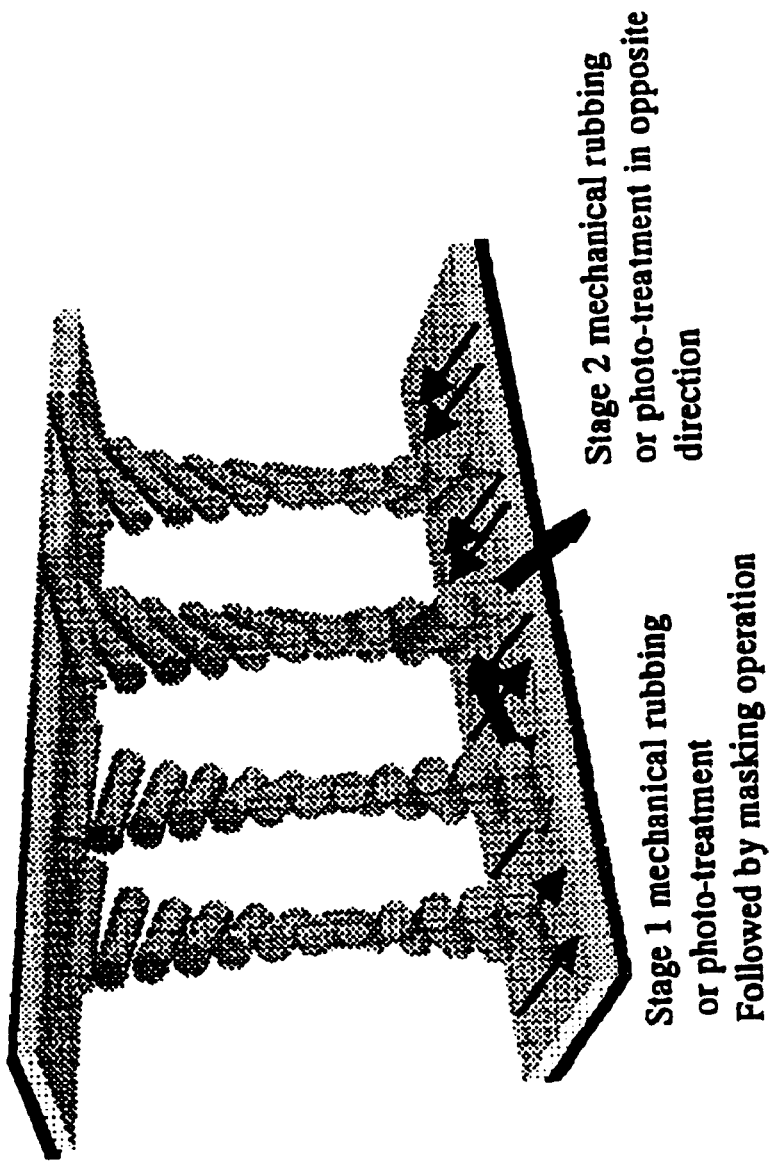
FIG. 1 shows a conventional dual domain TN device in which LC poly-domains in a twisted-nematic device are formed using masking techniques and mechanical rubbing.
Figure 2:
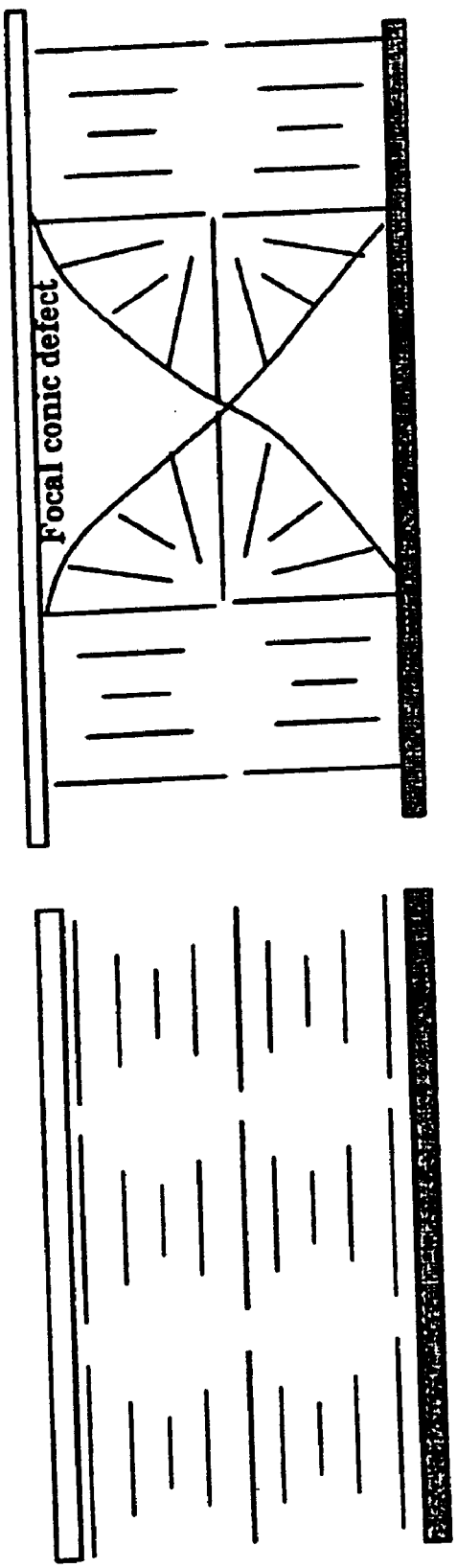
FIGS. 2(a) and 2(b) show a conventional cholesteric texture reflective device.
Figure 3:
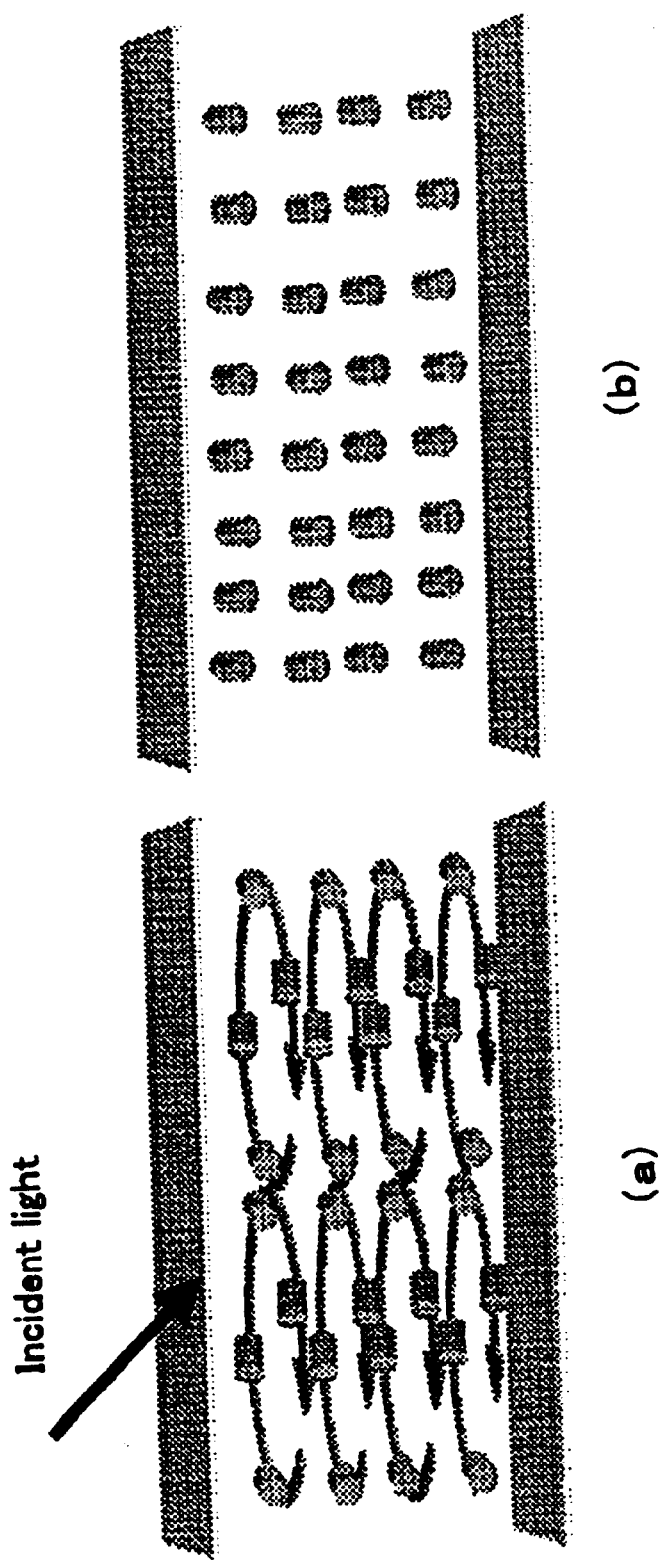
FIGS. 3(a) and 3(b) show a conventional molecular structure in a White-Taylor device.
Figure 4:
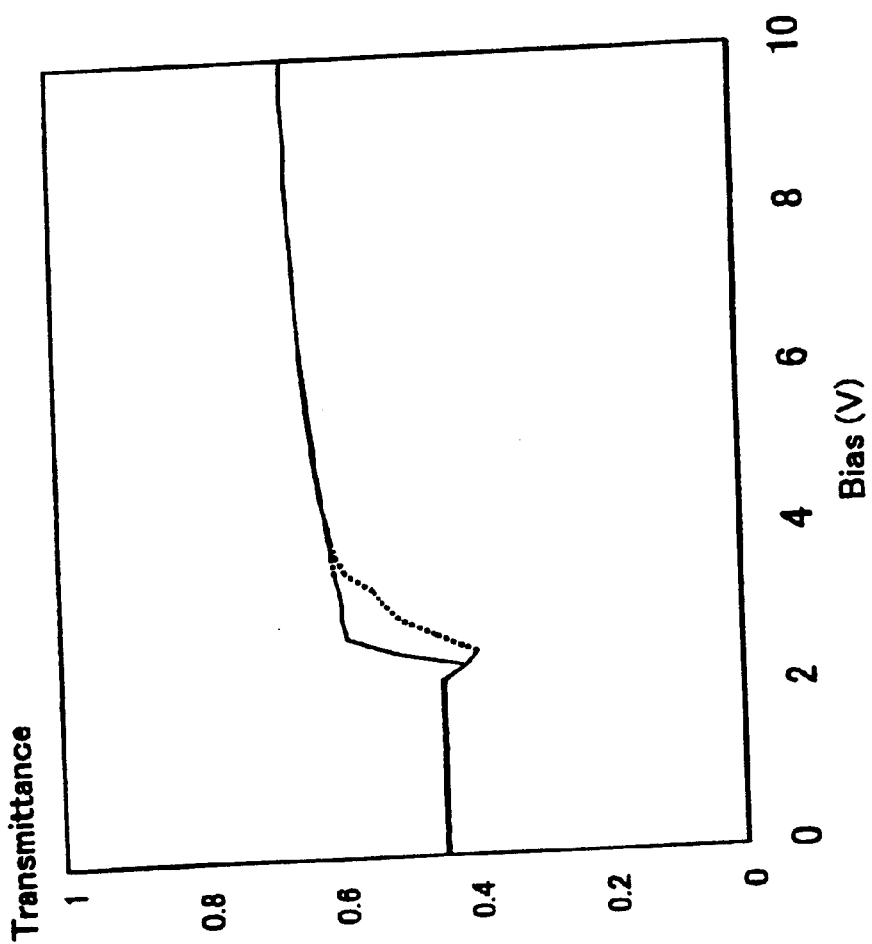
FIG. 4 shows a conventional transmittance vs. voltage characteristics for a conventional White-Taylor GH device.

Referring now to the drawings, and more particularly to FIGS. 5–22, there are shown preferred embodiments of the method and structures according to the present invention.

Colloidal-liquid crystal composites (CLCC) are a recently discovered class of soft solid which is formed from concentrated dispersions of colloidal particles in mesogenic liquid crystal hosts. The above composites may be formed by cooling isotropic dispersions across the isotropic-nematic transition point, where the visco-elastic shear modulus increases by several orders of magnitude, the shear modulas reaching as high as $10^5$ Pa for high concentrations of the organic colloidal particles as measured by a viscometer such as, for example, CSL 100 (Carrimed).

It has been proposed that these exotic composites are metastable structures comprising an interconnected network of aggregates of the colloidal particles that locally frustrate nematic order.

Liquid crystals used in the present invention may include nematic, super-twisted-nematic, cholesteric types such as, for example, but is not limited thereto. 4-n-pentyl-4'-cyanobiphenyl (5CB: from Aldrich), ZLI-4792, ZLI-2293, ZLI-4572(Merck), BDH E-44, E-7, E4, CEI, and CB 15. Chiral compounds such as S-811 and S-1011, but not limited thereto, may be incorporated in the liquid crystal for controlling optical characteristics of the liquid crystal. Especially, the chiral compounds preferably may be mixed with the liquid crystal, so as to provide a twisted alignment from 90 degrees to 300 degrees in the present invention.

It may be preferred to incorporate dye compounds into the liquid crystal in the present invention. The dye compounds may be incorporated, for example, by dissolving the dye compounds in the liquid crystal so that that the dye will be transported along with the liquid crystal. Any other method for incorporation of the dye compounds may be selected depending on the production processes. Examples of dye compounds include dyes such as, for example, Oil blue N, Sudan black B, Sudan 3, Sudan 2, indophenol blue, D-37, D-43, D-85 (form Merck), LSY-116, LSR-405, LSB-318, LSB-335, LSR-652 (from Mitsubishi Chemical Corp.), water soluble dyes, food coloring dyes, and cloth or fabric dyes.

Colloidal particles used in the present invention may be selected from particles made from organic materials, preferably from polymer materials. Such particles may be synthesized from polymerizable monomers such as, for example, acrylic acid, methacrylic acid, methyl (metha) acrylate, ethyl (metha) acrylate, hydroxy-ethyl (metha) acrylate, propyl (metha) acrylate, iso-propyl (metha) acrylate, hydroxy propyl (metha) acrylate, buthyl (metha) acrylate, hexyl (metha) acrylate, 2-ethyl-hexyl (metha) acrylate, stylene, divinyl benzene, vinyl toluene, vinyl ethers, vinyl halides, vinylidene halides, and mixtures thereof, but not limited thereto. Any other known polymerizable monomers may be useful in the present invention so long as necessary and desired properties are provided.

The colloidal particles used in the present invention may be prepared by any synthetic method suitable for forming colloidal particles. Such synthetic methods may include, for example, a dispersion polymerization method, a suspension polymerization method, or an emulsion polymerization method.

Dispersants or emulsifiers may be used in the present invention when the colloidal particles are formed. The dispersants and emulsifiers may be selected from the group consisting of anionic surfactants, cationic surfactants. amphoteric surfactants, non-ionic surfactants, polymeric surfactants such as poly (alkylene) oxide and derivatives thereof, polyesters such as poly-12-hydroxystearic acid (12HSA) and mixtures thereof.

Particularly, the colloidal particles formed from the polymerization of methyl methacrylate (PMMA) may be useful to incorporate into the liquid crystal in the present invention, because the PMMA particles behave as nearly perfect hard spheres. The PMMA particles may preferably be sterically stabilized with a thin layer (about few nanometers) of poly 12-hydroxystearic acid (12HSA), because adequate particle sizes of the PMMA particles may be obtained by the dispersion polymerization in cis-decalin together with poly-12-hydroxystearic acid (12HSA) as a solvent and may provide excellent micro-domain structures.

Particle sizes of the PMMA particles may range from about a few nanometers to about several hundreds nanometers, preferably from about 10 nm to about 400 nm because of micro-domain formation and optical properties. The particle sizes of the colloidal particles may be determined by any well-known technique including light scattering methods, centrifugal sedimentation methods gravity sedimentation methods and capacitance methods, but not limited thereto. Indeed any other method may be used. In the present invention, inorganic colloidal particles such as $SiO_2$, $TiO_2$, and $Al_2O_3$ may be incorporated together with the organic colloidal particles.

The colloidal liquid crystal composite comprising the micro-domain of the liquid crystal according to the present invention may be formed by adding the colloidal particles into the liquid crystal to achieve a well-dispersed mixture while creating the well defined micro-domains. Particularly, the incorporation may be suitably achieved by adding the colloidal particles into the liquid crystal in the isotropic state of the liquid crystal. The isotropic state may be obtained by heating the liquid crystal above their clearing temperature (i.e., clearing point). Then, the colloidal particles are added to the liquid crystal.

Subsequently, the admixture of the colloidal particles and the liquid crystals are stirred by mixing means such as a magnetic stirrer, a mechanical stirrer, or a homogenizer at the temperature above the clearing point. The sample is then cooled until well-defined micro-domains are provided. Typically, several hours may be required to obtain such a well-defined micro-domains. However, the time duration for mixing may differ depending on the temperature of the mixing, materials used, and kinds of mixing means. etc.

Electro-optical cells used for the present invention may be prepared from commercially available ITO (indium tin oxide) coated glass slides. but not limited thereto. Indeed, any other conductive materials such as, for example, ATO (arsenide tin oxide), ZnO, $SnO_2$, $In_2O_3$, IZO (indium zinc oxide), and a mixture thereof may be used in the present invention. The glass slides may be spin-coated with a polyimide film to obtain desired alignment of the liquid crystal, but not limited thereto. Indeed, any other oriented films may be used such, as for example, carbon film including graphite or DLC, $SiO_2$ films, and PVA (polyvinyl alcohol) films. The polyimide film may be adopted typically to form an alignment layer, and polyimide may be selected from a commercially available polymide for homogenous alignment of the liquid crystal such as AL1051, AL1254 (from Japan Synthetic Rubber:JSR). However, any other polyimide films may be used in the present invention. A cell gap may be controlled by spacers made of any suitable materials such as glass, or polymeric particles.

Assembling of the electro-optical cell may be achieved by any well-known process in the art. For example, substrates made of glass may be disposed opposite sides of spacers so as to define the electro-optical cell. The resulting electro-optical cell may be heated to the temperature above the clearing point of liquid crystals used, and then the isotropic dispersion of the colloidal particles and the liquid crystal materials may be introduced therein. The electro-optical cells may be then allowed to cool to an ambient temperature. Then polarizers may be assembled on both sides of the electro-optical cell in desired arrangements.

Sizes of the micro-domains can be changed from about a few micrometers to about several hundreds micrometers depending on the concentration of the colloidal particles. There is no substantial limitation to the size of the micro-domains in the present invention. However, when the size of the micro-domain becomes larger and larger, characteristic properties such as electro-optical properties of the CLCC according to the present invention may be reduced accordingly.

Figure 5:
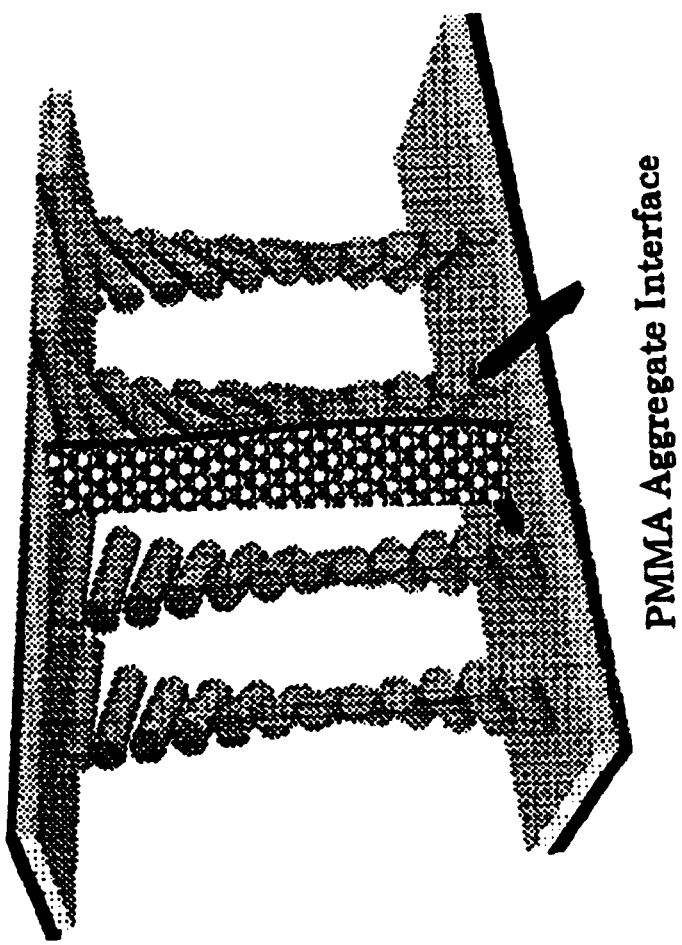
FIG. 5 shows naturally-occurring LC polydomains creating the internal interfaces in a CLCC twist nematic device.
Figure 6:
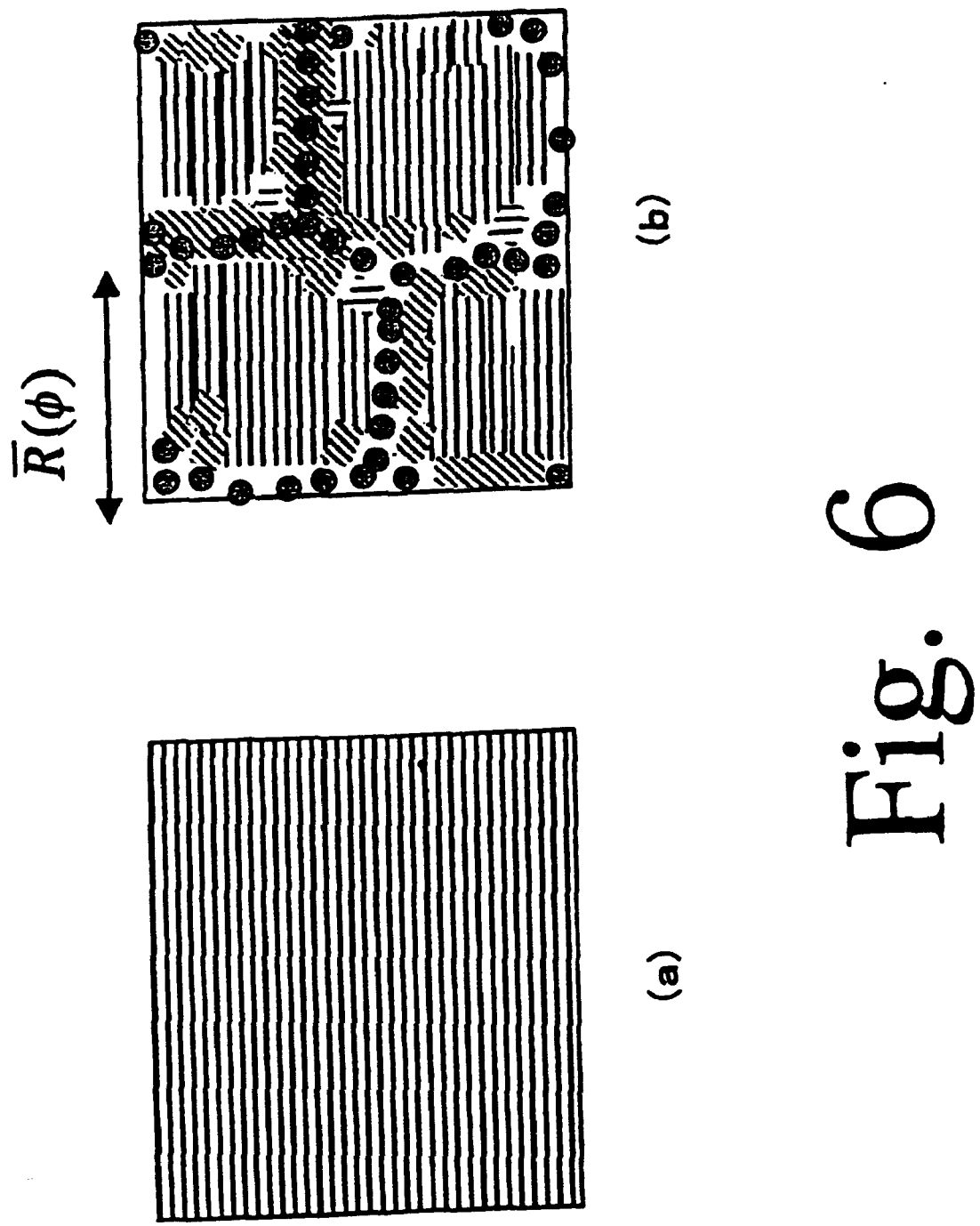
FIGS. 6(a) and 6(b) show domain structures of the liquid crystal with FIG. 6(a) showing a conventional structure and FIG. 6(b) showing a poly-domain according to the present invention.
Figure 7:
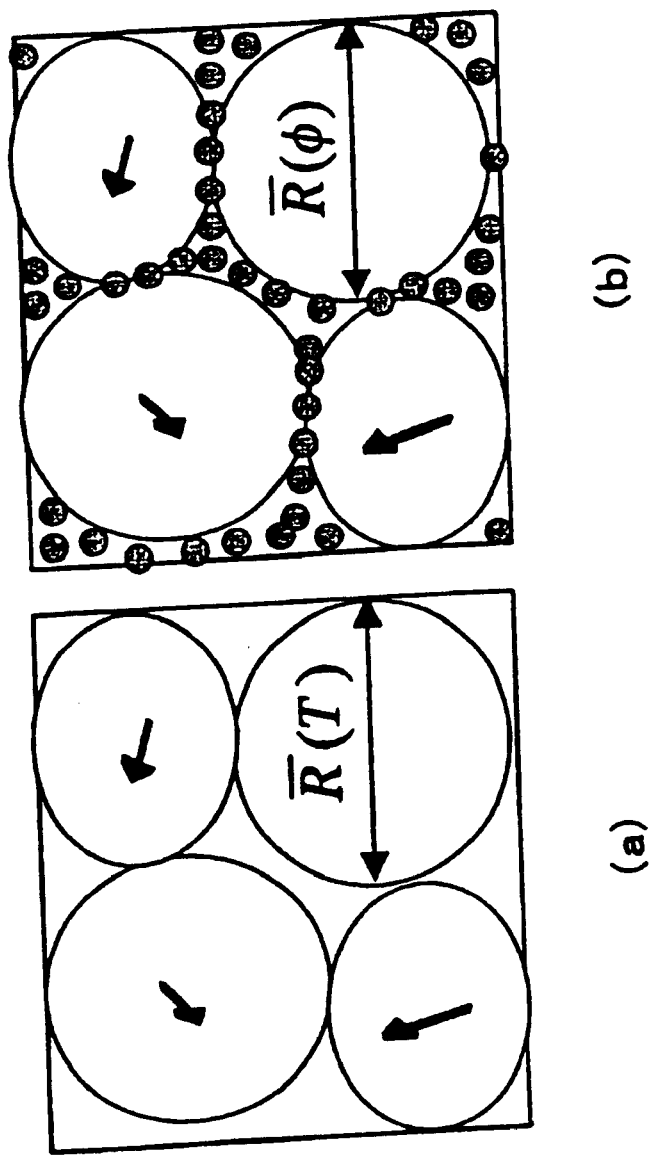
FIGS. 7(a) and 7(b) respectively show conventional poly-domain structures in a cholesteric texture achieved by polymer dispersion or surface treatment, and by forming a CLCC network according to the present invention.
Figure 8:
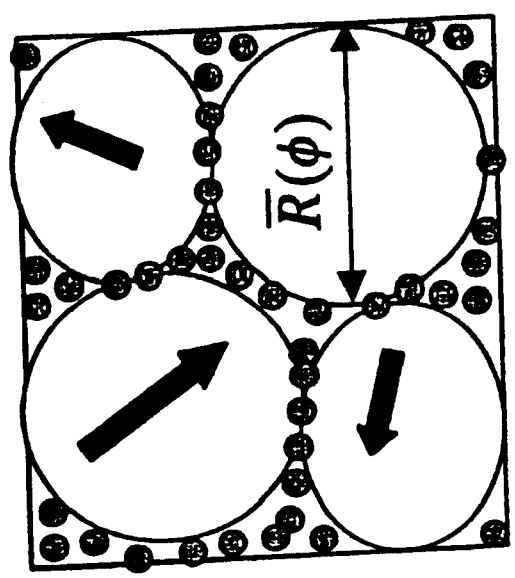
FIGS. 8(a) and 8(b) respectively show schematic illustrations of LC domain size modification in a White-Taylor type device by annealing according to the conventional techniques, and by control of CLCC cellular morphology according to the present invention.
Figure 8:
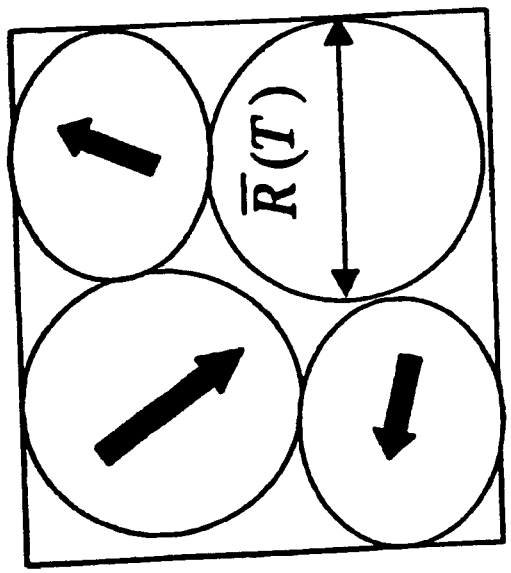
Figure 9:
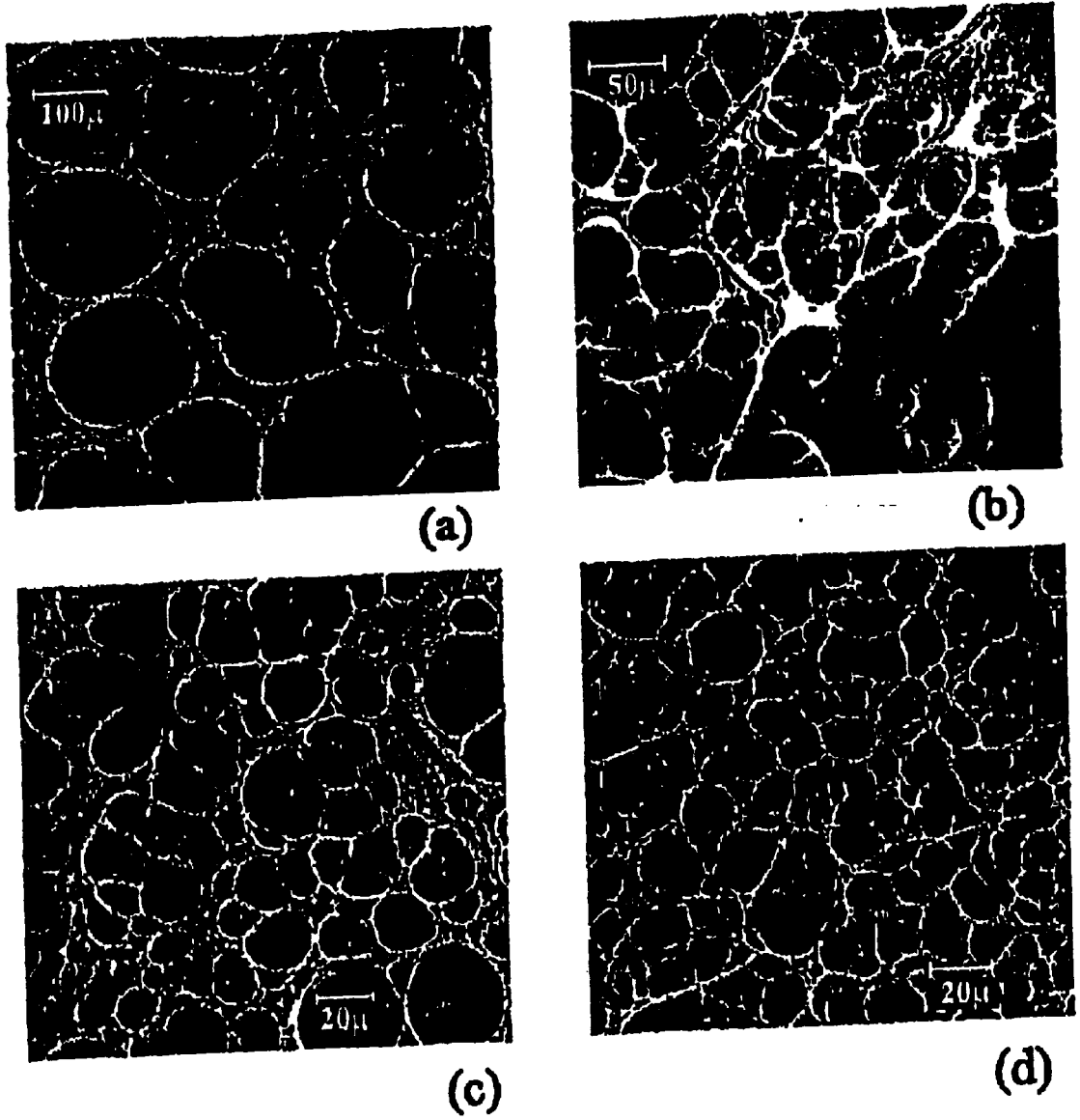
FIGS. 9(a)–9(d) show reflection mode confocal images of the "cellular" microstructure formed at the isotropic-nematic transition in a CLCC composite.
Figure 10:
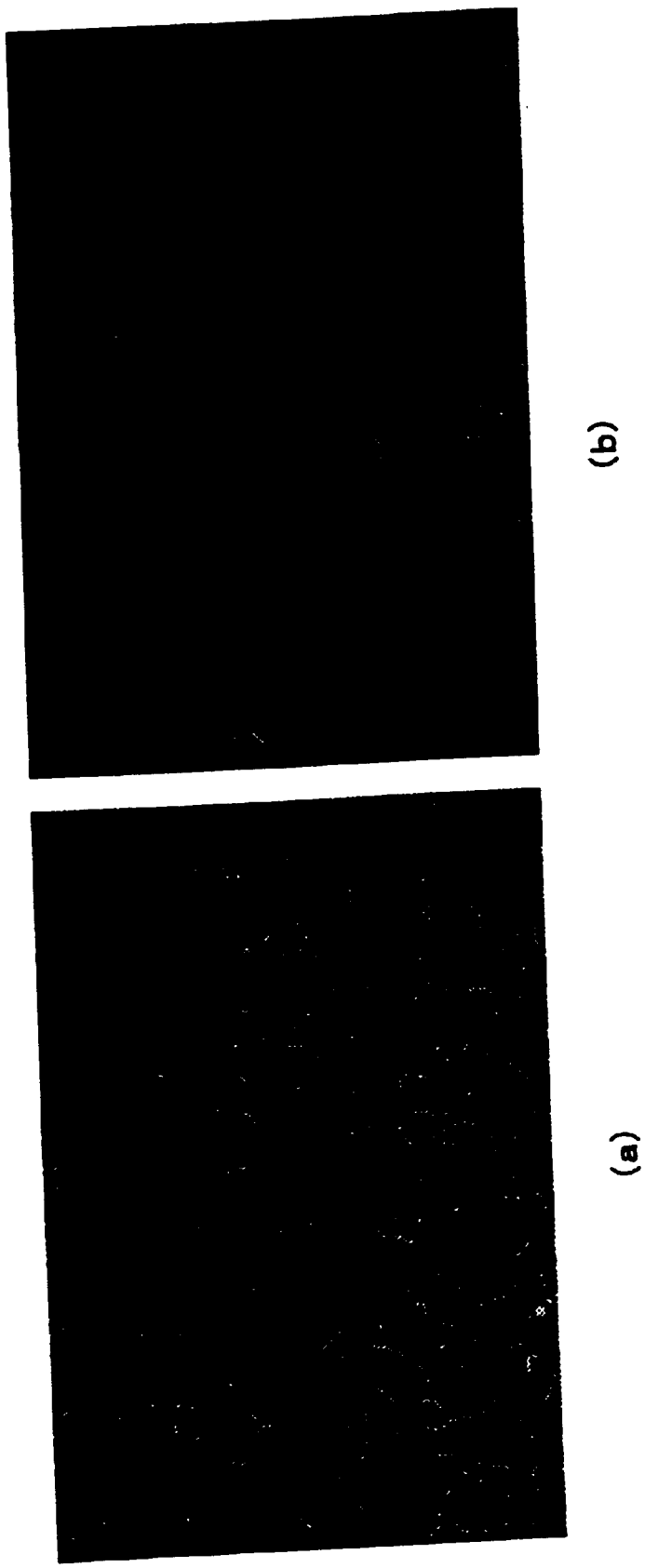

FIG. 5 shows an embodiment of the cell configuration of a twist nematic cell according to the invention. The substrates are coated with an alignment layer so as to obtain tangential alignments of the liquid crystals, but the invention is not limited thereto. The present invention may adopt an angle between about 70 and about 110 degrees. No rubbing or other similar surface treatment was applied thereto.

A CLCC was prepared by using a liquid crystal that has positive dielectric anisotropy such as 5CB, ZLI-4792, or ZLI-2293, which was mixed with a certain amount of the colloidal particles together with an appropriate amount of a typical chiral material such as S-811. When the device is designed to switch between optically ON and OFF states between cross-aligned polarizers, the cell gap d and the Δn of the liquid crystal must satisfy the Maiguin condition as follows:

$$\Delta nd/\lambda=(4m^2-1)^{1/2}/2, m=1,2,3,\ldots, \qquad (1)$$

wherein λ is a wavelength incident to the device. The concentration of chiral material may be adjusted so as to give a helical pitch of 4 times as large as the cell gap.

After cooling down to an ambient temperature across the clearing temperature, micro-domain structures in which the colloidal particles form a network around the micro-domain of the liquid crystal, may be formed, and the network of the colloidal particles separate the liquid crystal into micro-domains. Another type of a device configuration may also be prepared by using a homeotropic alignment polyimide and liquid crystal with negative dielectric anisotropy. The above devices may prepared in the same way as described above.

FIG. 6(b) shows a further embodiment of the liquid crystal display in a parallel-aligned cell according to the present invention. FIG. 6(a) shows the conventional mono-domain parallel aligned nematic cell director structure. and FIG. 6(b) shows the poly-domain structure in the parallel-aligned cell included in the CLCC device according to the present invention with parallel-rubbed surfaces. It was found that the average domain size was determined by colloidal particle concentration in the present invention. In the embodiment shown in FIG. 6(b), a liquid crystal that has positive dielectric anisotropy such as 5CB, ZLI-4792 and ZLI-2293 may be used. The substrates are coated with an alignment layer and the alignment layer was aligned by rubbing or with other similar suitable surface treatment.

The polarizers may be assembled at both sides of the cell in a right-angle alignment such that the optical axes are set to an angle corresponding to an angle of the liquid crystal director. The angle of the liquid crystal director was usually 45 degrees for the best optical performance. As shown in FIG. 6(a), the conventional parallel-aligned cell shows a birefringence effect similar to the operational mode of typical birefringence mode. In the present invention, upon cooling to an ambient temperature, the colloidal particles form a network around the micro-domain of the liquid crystal so as to clearly define the micro-domains as shown in FIG. 6(b).

When the device is designed to switch between optically on and off states between crossed polarizers, the cell gap and the Δn of the liquid crystal must satisfy the following relation:

$$\Delta n d/\lambda = m/2, m=1,2,3), \ldots, \quad (2)$$

FIG. 7(b) shows another embodiment of a cell configuration of a cholesteric texture cell. FIG. 7(a) shows the conventional cell configuration and FIG. 7(b) shows the cell configuration according to the present invention. In a cholesteric texture, a domain is defined as a region of uniform helical axis orientation. The average domain size also depends on particle concentrations in the cholesteric texture. The arrows show helical orientation axes. In the embodiment shown in FIG. 7(b), it is not necessary to coat the substrate with an alignment layer nor to treat the substrate in a similar manner. However, the present invention does not intend to exclude usage of such alignment layers in any embodiments described herein.

The cell shown in FIG. 7(b) is formed by a mixture of a liquid crystal that has positive dielectric anisotropy and a high optical anisotropy Δn such as BDH E-44 and E-7, a certain amount of the colloidal particles as described above, and an appropriate amount of a chiral compound such as S-811. The cell gap may be selected generally to be the same as conventional gaps. The amount of the chiral compound is adjusted to satisfy the equation $np=\lambda$, where n is the average refractive index of the liquid crystal, p is the helical pitch, $\lambda$ is the wavelength of light which is to be reflected off the cell in the planar state such that the product of the helical pitch and the average refractive index of the liquid crystal may be within a wavelength range of visible light.

After cooling down to an ambient temperature, the cell shows a structure with colloidal particles forming a network so as to form the micro-domains of the liquid crystal as shown in FIG. 7(b).

FIG. 8(b) shows a further embodiment of the cell configuration for a dye cell assembled according to the present invention which corresponds to a modification of a White-Taylor type GH (Guest-Host) device. A conventional domain structure is shown in FIG. 8(a) and the novel domain structure according to the present invention is shown in FIG. 8(b) for comparison. The arrows also indicate the random director orientations of intra-domain structures. In the present invention, the poly-domain structure in the White-Taylor device is realized in the electro-optical cell containing the CLCC. The average domain size may be also determined by particle concentrations as described above. The electro-optical cell shown in FIG. 8(b) is formed using substrates having electrodes, and each of the substrates is coated with an alignment layer.

The alignment layer is formed by commercially-available polymide for homogenous alignment such as AL1051 or AL1254 (from JSR). In addition, no rubbing or other similar surface treatment is applied. The CLCC may be prepared by using any liquid crystal having positive dielectric anisotropy such as 5CB, ZLI-4792 or ZLI-2293 which is mixed with a certain amount of the colloidal particles as described above, an appropriate amount of a typical chiral material like S-811, and a dye mixture for operation in a guest-host mode. A series of dye compounds may be used to form the reflective display in the GH mode. The cell gap or the helical pitch was preferably adjusted to obtain a twist of 300 degrees in the electro-optical cell, but the invention is not limited thereto, and the present invention may adopt a twist angle between 180 and 360 degrees.

After the electro-optical cell was cooled down to an ambient temperature, the cell exhibited a structure with micro-domains created by the colloidal particles which form a network in the liquid crystal so as to define the micro-domains of the liquid crystal as shown in FIG. 8(b).

Another type of a device configuration may be a device with a combination of polyimide for homeotropic alignment and a liquid crystal with negative dielectric anisotropy, and such devices may be prepared similarly as described above. However, any other oriented films may be available in the present invention so long as the same advantage may be obtained. Hereafter, the present invention will be further explained in detail using specific examples which are given only for illustrative purposes rather than to indicate limits of the present invention.

EXAMPLES

Example 1

Method of Forming A Microstructure

PMMA particles were synthesized by dispersion polymerization in a cis-decalin solvent together with poly-12-hydroxystearic acid (12HSA) as a steric stabilizer under controlled nucleation and growth mechanisms. Poly-12-hydroxystearic acid (12HSA) was grafted onto the PMMA particles through the polymerization process of the PMMA particles and was formed as a thin layer (about several nanometers) on the PMMA particles, thereby stabilizing the PMMA particles sterically. The above synthesis scheme may provide an isotropic suspension of the PMMA particles in which the PMMA particles were regarded to be substantially hard spheres.

Conditions of the synthesis such as, for example, monomer concentrations, a kind and an amount of radical initiator, reaction temperature, etc., may be selected from those well-known in the art depending on a particle size desired and compositions of particles synthesized. In Example 1, the particle size of the colloidal PMMA particles was selected to be 190 nm. The PMMA particles had an almost monodispersed size distribution. The particle size of the colloidal PMMA particles may be determined by a light scattering method using an Ar-ion laser.

The colloidal PMMA particles synthesized as above were initially dispersed in cis-decalin at approximately 30% volume fraction. Then, the solvent was evaporated to remove cis-decaline and the dried particles were redispersed in an isotropic liquid crystal material heated above the clearing temperature using a magnetic stirrer. The mixing was continued at the temperature higher than the clearing temperature for several hours. In Example 1, 4-n-pentyl-4'-cyanobiphenyl (5CB) was used as a liquid crystal, because the compound behaves as a liquid crystal without any additives and has a low isotropic temperature (i.e. clearing point).

FIGS. 9(a)–9(d) show confocal microphotographs of micro-domains obtained in Example 1. The micro-domains of the liquid crystal shows a "cellular micro-structure" where cavities comprising the liquid crystal are separated by particle-rich interfaces (chains or network) caused by cooling across the isotropic-nematic transition. The LC domains within the cavities showed a typical optical birefringence, and therefore, it was confirmed that all liquid crystal molecules were oriented to the direction along which the polyimide alignment layers were processed.

Example 2

Twist Nematic Cell

A twist nematic cell according to the present invention was formed as described below. Cells of 5 μm thick were prepared using substrates coated with polyimide (JSR AL1254). No rubbing (i.e., aligning process) was applied to the substrates. To commercially available liquid crystal mixture (Merck ZLI-4792 with a helical pitch of 20 μm) the colloidal PMMA particles of 5% by weight were incorporated. Then the mixture was diluted to 2% and 1% with a stock material to obtain the CLCCs with five different particle concentrations. These mixtures were introduced into the cells so as to form 5 samples of the electro-optical cells. At these concentrations, all composites were found to be rigid and self-supporting.

FIGS. 10(a) and 10(b) respectively depict schematic morphologies of the device of Example 2 taken under the polarizing microscope with and without bias voltages. FIG. 10(a) shows a morphology without applying a bias voltage, and FIG. 10(b) shows a morphology with applying a bias voltage. As shown in FIG. 10(a), the particles induce a considerable disorder, which is clearly visible at zero bias. When applied with a strong electric field. the director lines up vertically relative to the plane of the paper, and therefore the disclinations become less visible so that a dark view is given in FIG. 10(b).

Figure 11:
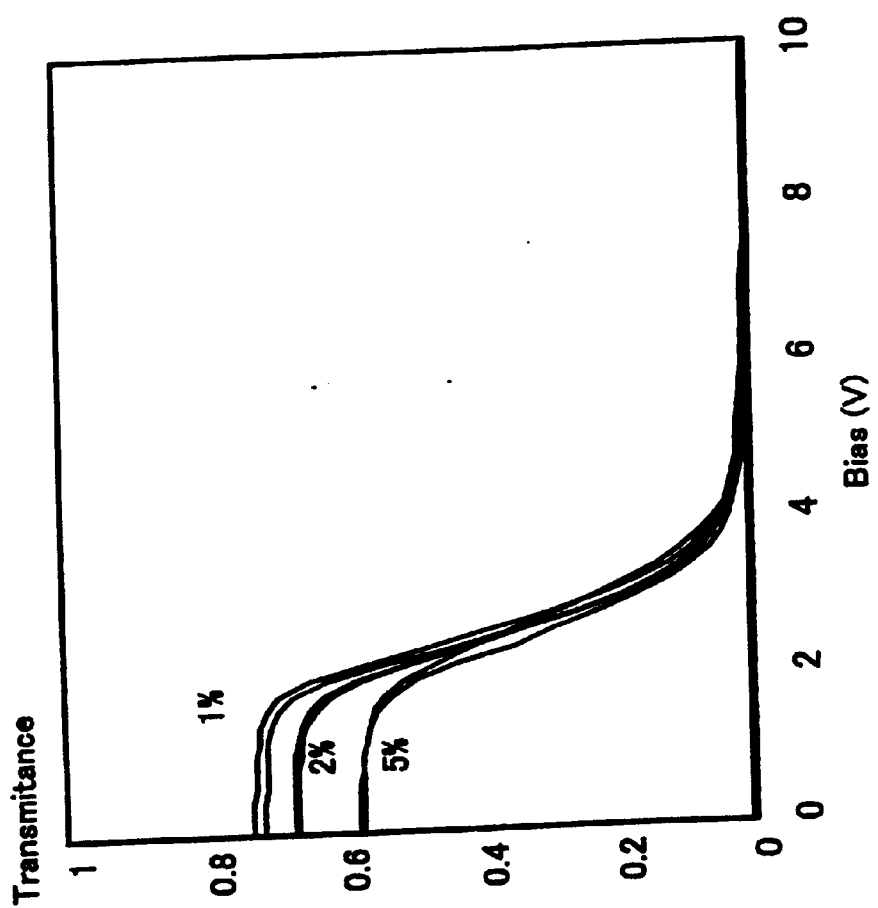
FIG. 11 shows a transmittance vs. voltage characteristics for TN cells with a CLCC.

When the bias voltage was applied, several disclination loops, which disappear in a several seconds, were generated. Then the electro-optical responses of the cells were examined by sandwiching them between crossed polarizers. The electro-optical responses for the electro-optical cells with 1 wt %, 2 wt % and 5 wt % of the colloid particles are shown in FIG. 11. The electro-optical responses were measured by applying a 30 Hz square wave of an amplitude range of 0–10 V to the cells. Light transmittance was measured using a 633 nm He-Ne laser as a light source and a PIN-photo diode as a photodetector. Morphologies were observed under a polarizing microscope while changing the applied bias voltage to the cell in the same way as described above.

As shown in FIG. 11, the transmittance decreases as the concentration of the colloidal particles increases. The contrast ratios were found to be approximately one hundred to one or less at a bias of 5 V and several hundreds to one at a bias of 10 V from FIG. 11 for each electro-optical cell. It was observed that the value at 5V was not as large as that of typical twisted nematic cells. This may be caused partly by light scattering from the disordered domain boundaries.

When biased with 5V, the cell turned dark since the liquid crystal molecules line up along the electric field and the disclination loops started to disappear. The viewing angle was symmetric because the alignment directions of the domains in the poly-domain structure of the liquid crystal were randomly distributed, thereby improving the viewing angle characteristics.

Figure 12:
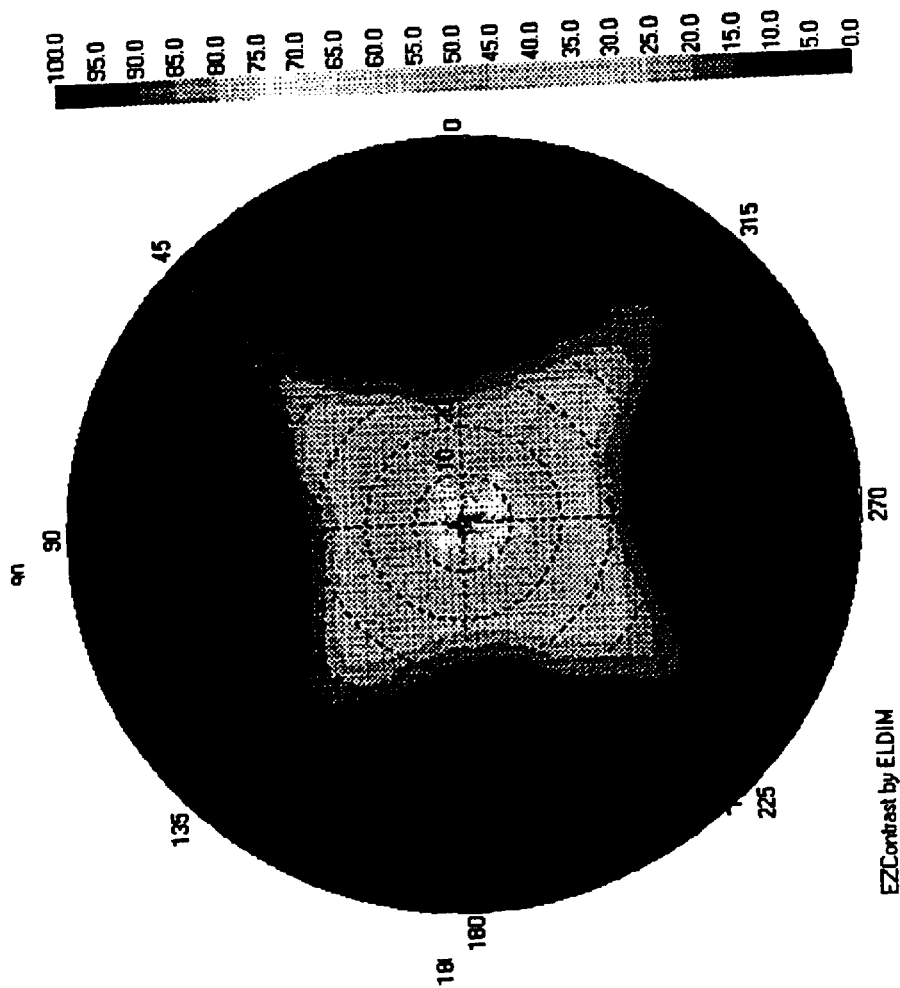
FIG. 12 shows a viewing angle distribution of a TN device with a CLCC density of 2 wt %.
Figure 13:
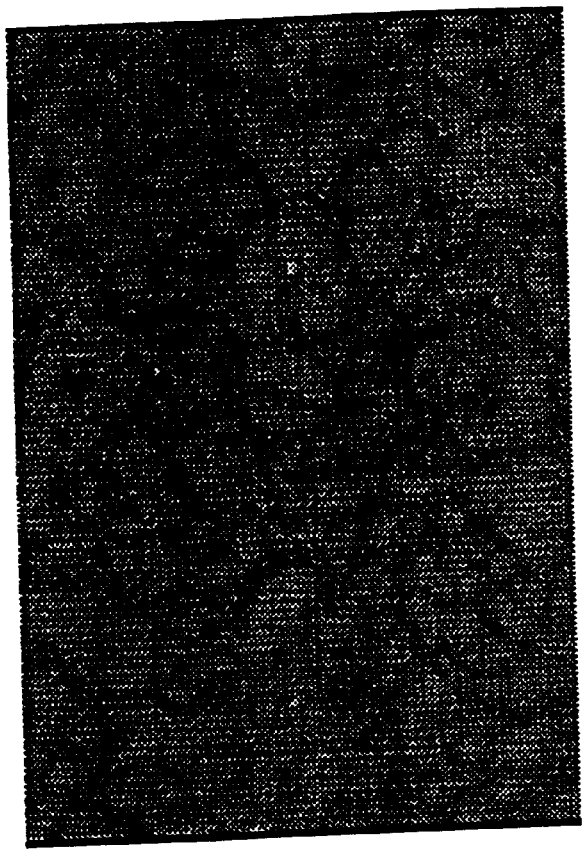
Figure 13:
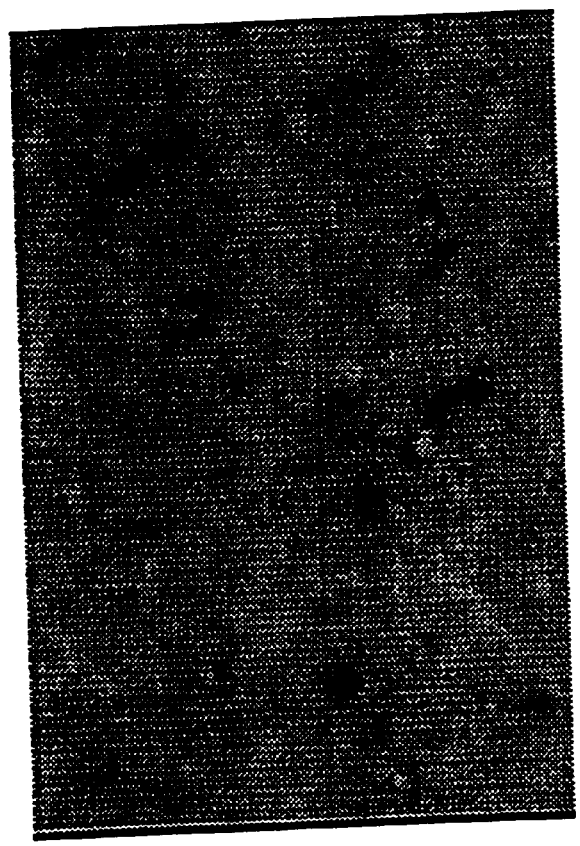

FIG. 12 shows viewing angle characteristics observed in Example 2. The viewing angle characteristics were significantly symmetric. as shown in FIG. 12. In the voltage vs. transmittance curves, little hysterisis all over the bias range was observed, despite the disclination lines created and annihilated, depending on whether the bias decreases or increases. Cycle stability of the device of Example 2 was further examined as below.

The liquid crystal was forced by the electric field to align vertically relative to the surface and when the bias voltage was removed, the liquid crystal relaxed back to the initial alignment.

The particle network was not significantly perturbed by the applied bias even over many ON/OFF cycles. The CLCC showed at least comparable electro-optical switching characteristics to the typical particle-free liquid crystal materials over the ON/OFF cycle test.

Example 3

Parallel-Aligned Nematic Cell

A parallel-alignment cell in birefringent operation according to the present invention was formed as described below.

The cells were prepared in the same way as for the twist nematic cells except that the cell thickness was set to be 10 μm and that the alignment was set parallel. FIGS. 13(a) and 13(b) respectively show microphotographs of morphologies of the device taken by a polarized microscope with and without bias. That is, FIG. 13(a) shows the morphology obtained without the bias voltage, and FIG. 13(b) shows the morphology obtained with applying the bias voltage.

In the bias-off state shown in FIG. 13(a), the domains show distributions of the alignments due to inter-domain disorder induced by the colloidal inclusions, thereby yielding a light scattering. When the bias voltage of 5V is applied to the device as shown in FIG. 13(b), the CLCC shows the similar behavior to the twist nematic cells while the director points to the aligned direction.

Figure 14:
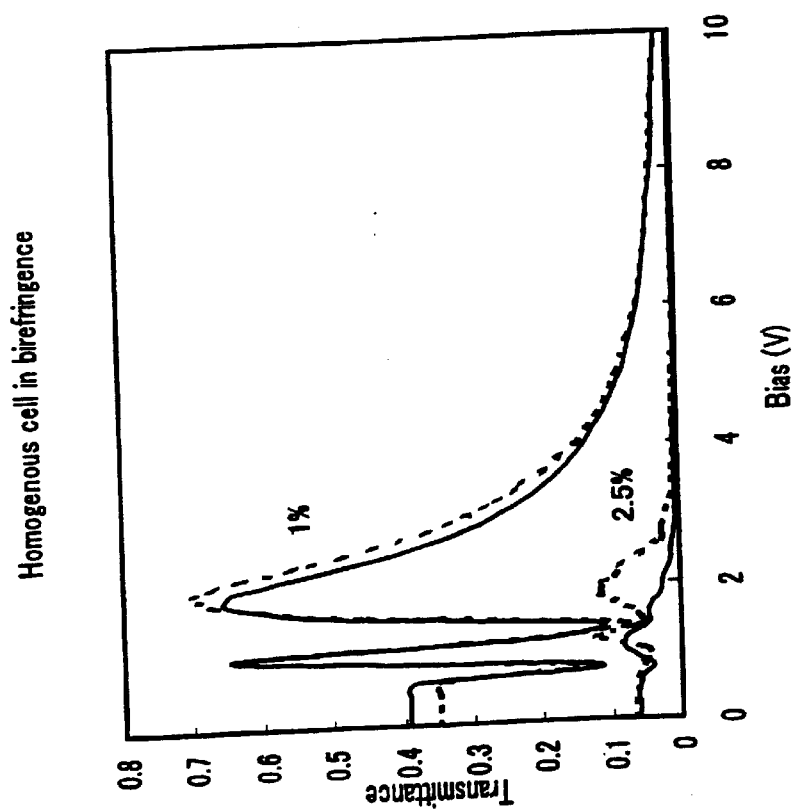
FIG. 14 shows a transmittance vs. voltage characteristics in birefringence mode for homogenous-aligned cells.
Figure 16:
FIGS. 16(a)–16(c) respectively show polarized microscopic images for a cholesteric texture with a CLCC at a planar state, a magnified view in planar state, and a focal conic state.
Figure 16:
Figure 16:

FIG. 14 shows the transmittance vs. voltage characteristics of the parallel aligned nematic cell of Example 3. In FIG. 14, the results of 1 wt % and 2.5 wt % both for the bias ON and OFF states are shown, respectively. The upper set of the curves are the results for 1.0 wt %, and the lower set of the curves are the results for 2.5 wt %. The solid lines correspond to the transmittance when the bias voltage is decreased and the dashed lines correspond to the transmittance when the bias voltage is increased.

For the two sets of the curves, little hysterisis was observed. The contrast ratio, obtained as light transmittance through the crossed polarizers, was determined to be 50 for 1 wt % of the colloid particles and 20 for 2.5 wt % of the colloid particles and shows a comparable birefringent effect to that of a conventional device. Due to inter-domain disorder the maximum transmittance becomes lower with increasing particle concentration from 1 wt % to 2.5 wt %. Since the Δnd is much higher than the optimum value, the curves show oscillation in the low bias range.

Compared with conventional birefringence devices, which do not have a polydomain structure and therefore, the viewing angle is asymmetric, the polydomain structure of CLCC electro-optical devices according to the present invention may show homogenous viewing angle characteristics comparable to the existing technologies like a two-domain structured device.

It was found that the CLCC in the parallel-alignment geometry also exhibited optical contrast states in scattering mode without polarizers (i.e., analogous to the operational mode of a polymer-dispersed liquid crystal). The cells were prepared in the same way as described above except that no polarizers were used. A liquid crystal with an optical birefringence as high as possible was used in order to enhance light scattering. The application of voltages aligns these domains along with the field, thereby reducing scattering of the light.

Figure 15:
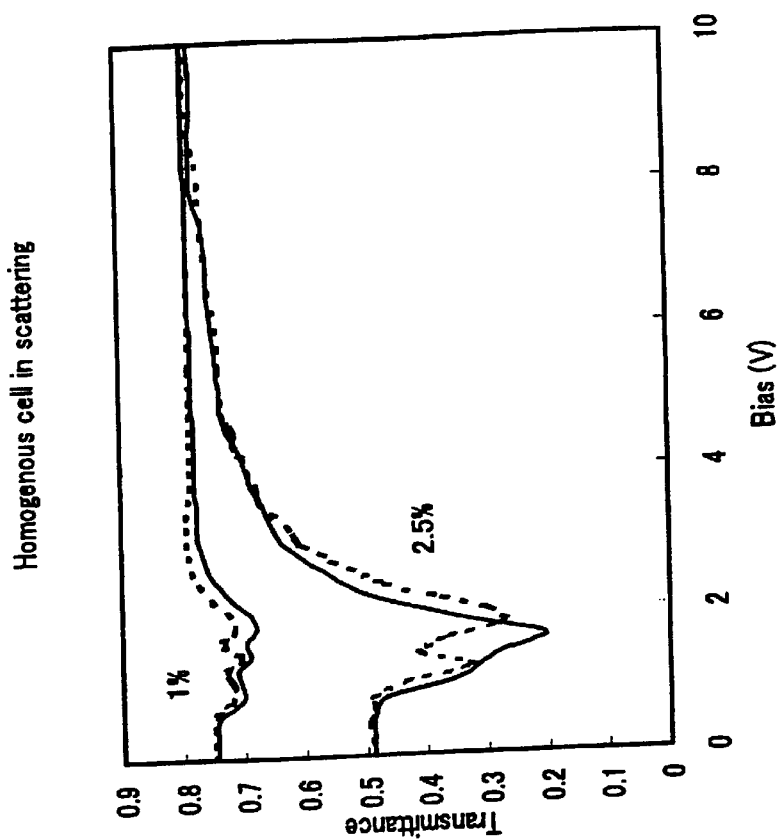
FIG. 15 shows a transmittance vs. voltage characteristics in light scattering mode for homogenous-aligned cells.

Using the same cell prepared for the birefringence mode as described above, the transmittance was measured in scattering mode as a function of the bias. FIG. 15 shows transmittance vs. bias curves of the electro-optical cells with different colloidal particle concentrations. In FIG. 15, the results for the colloidal particles at 1 wt % (upper set) and 2.5 wt % (lower set) are plotted. The solid lines correspond to the transmittances when the bias voltage is decreased and the dashed lines correspond to the transmittance when the bias voltage increased. The contrast ratio for 2.5 wt % is approximately 3.8 which is not low considering that the birefringence of 5CB is not very high. While the cell with 1 wt % concentration shows much lower contrast ratio, this may simply result from the inter-domain disorders being smaller.

Example 4

Cholesteric Texture Cell

A cholesteric texture cell according to the present invention was formed as described below. Using a commercial host material (BDH E-44) and chiral additive (a mixture of Merck S-811 and S-1011), the liquid crystal composites containing the colloidal powder from 1~10 wt % were prepared. It was found that rigid, self-supporting composites could be prepared in these materials over the full particle concentration range as well. The mixture was then introduced in a 10 μm thick cell to form an electro-optical cell. No polyimide coating was applied on the substrates, and the CLCC was introduced with heating above the clearing temperature. The inventors found that the optical properties of cholesteric liquid crystalline composites were not degraded by the presence of the colloidal particles.

FIGS. 16(a)–16(c) show microphotographs of morphologies of the liquid crystal composite in the cell formed in Example 4, which was made to reflect in green. FIG. 16(a) shows a cholesteric texture containing the CLCC in the planar state, and FIG. 16(c) shows a magnified view in the reflective planar state of FIG. 16(a). FIG. 16(b) shows a cholesteric texture in the focal conic (scattering) state. In both states, the particles are localized in branches of the network and helical vectors in different micro-domains was confirmed to be directed to different directions.

Figure 17:
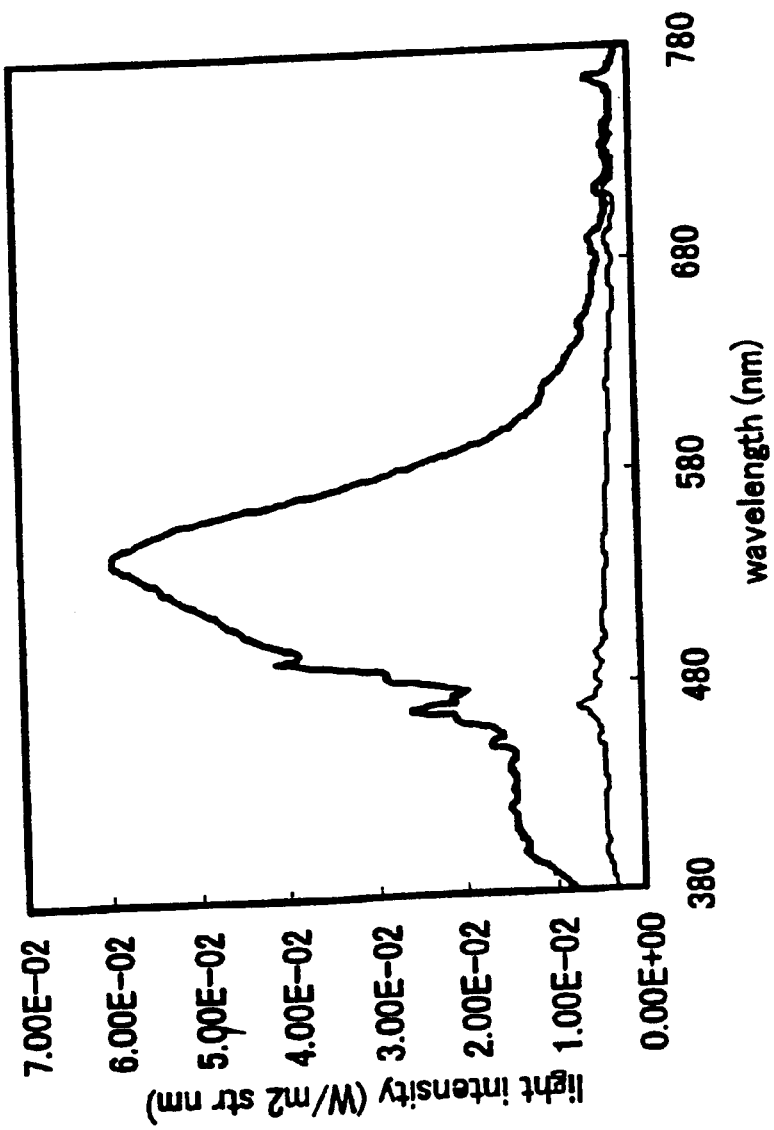
FIG. 17 shows a reflectance spectrum for a cholesteric composites with 10 wt % CLCC.
Figure 18:
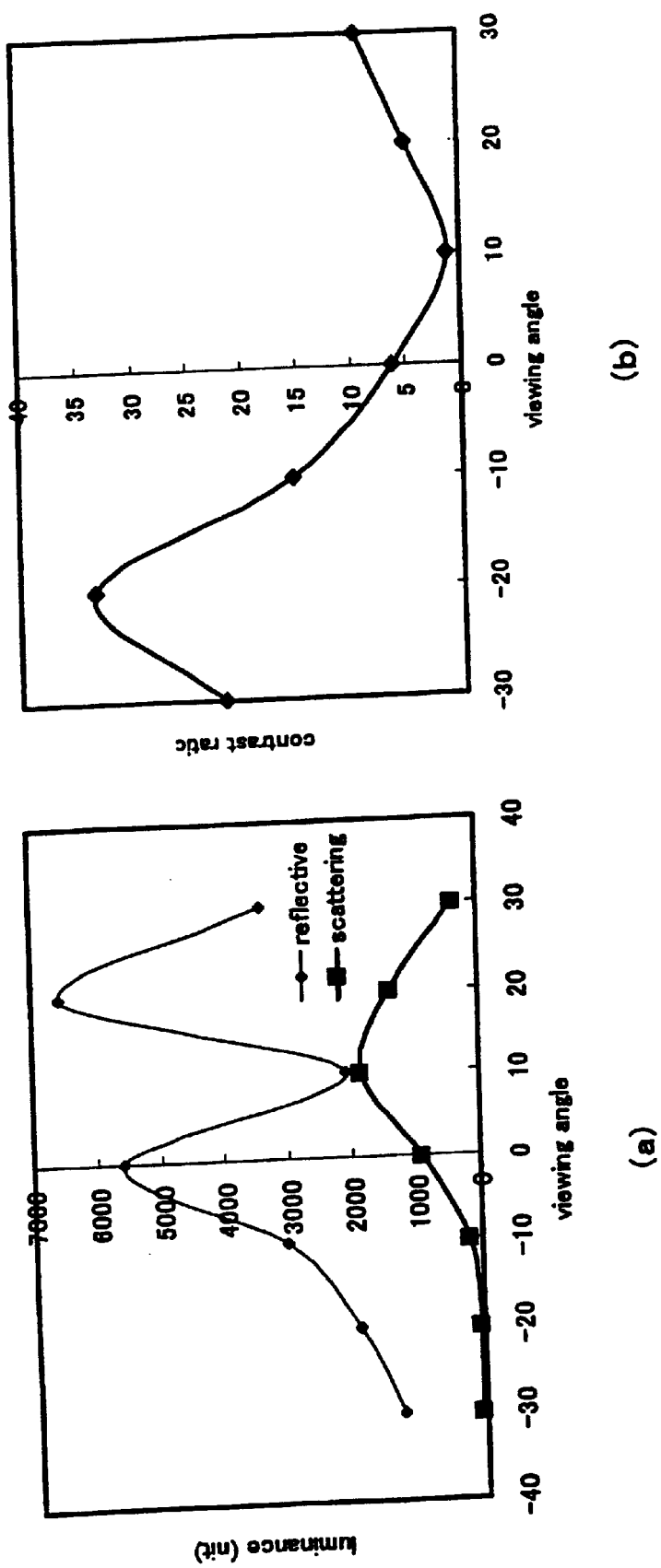
FIGS. 18(a) and 18(b) respectively show viewing angle characteristics for a cholesteric composites with 10 wt % CLCC with luminace intensities in reflective and scattering states and contrast ratio.

FIG. 17 shows intensities of the reflected light (upper curve) and the scattered light (lower curve) as a function of wavelength for a cholesteric liquid crystal composite containing 10 wt % colloid in the planar (exhibits selective reflection) and in the focal conic state (weakly scattering). Illumination was normal to the sample surface, and the reflected light was collected at an angle of 30 degrees. The integrated luminance over this wavelength range shows a contrast ratio with excess of 10:1 as shown in FIG. 17.

FIGS. 18(a) and 18(b) respectively show the reflective-light intensities as a function of the angle of the cell relative to the incident light beam and the contrast ratio thereof. The reflected light was detected by a photometer placed at angle of 30 degrees off from the incident beam. As seen in FIG. 18(a), the intensities for the reflective and scattering states show quite a good distribution of the reflected light except at 10 degrees. At 10 degrees, specular reflection occurred, and the incident light intensity was decreased in order to protect the detector from saturation. As shown in FIG. 18(b), the contrast ratio was significantly high over the entire angle range. The viewing angle was sufficiently spread as much as the viewing angle of the conventional cell.

Figure 19:
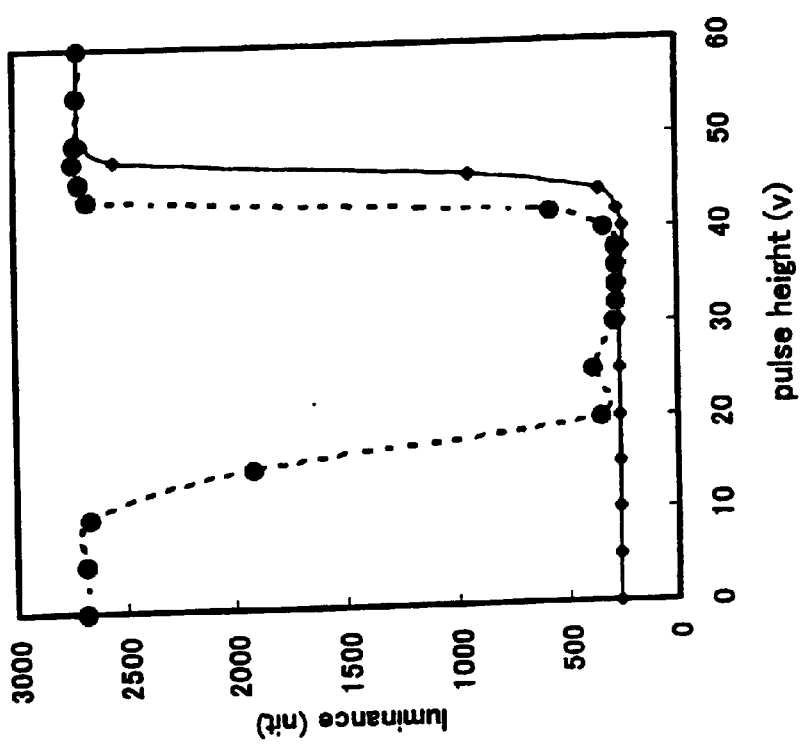
FIG. 19 shows electro-optical characteristics for a cholesteric composite with 10 wt % CLCC.

The inventors have also explored bistability in the same sample and found that the bistability was also maintained in the composite according to the present invention. The bistability of the electro-optical cell according to the present invention is shown in FIG. 19. The dashed line shows the switching characteristics from the reflectance and the solid line shows the switching characteristics from the scattering. As shown in FIG. 19, sufficient switching properties are obtained both for the scattering reflectance modes with ratios about 10:1. The weak scattering mode in the focal conic state was found to be stabilized relative to the reflective mode in the planar state by the presence of the colloidal particles.

Example 5

Dye Cell

A dye cell according to the present invention was formed as described below. A CLCC was obtained by blending a commercially available liquid crystal mixture (from Merck ZLI-2293) with black dye composites (from Mitsubishi Chemical LSY-116 at 0.72 wt %, LSR-405 at 0.19 wt %, LSB-318 at 0.97 wt %, LSB-335 at 1.06 wt % and LSR-652 at 0.48 wt %) to provide substantial light absorption and a chiral compound was introduced in a cell with 10 μm thickness as described above for providing a helical pitch of 12 μm, whose substrates were coated with polyimide (AL-1254: JSR) and polyimide was not rubbed.

Figure 20:
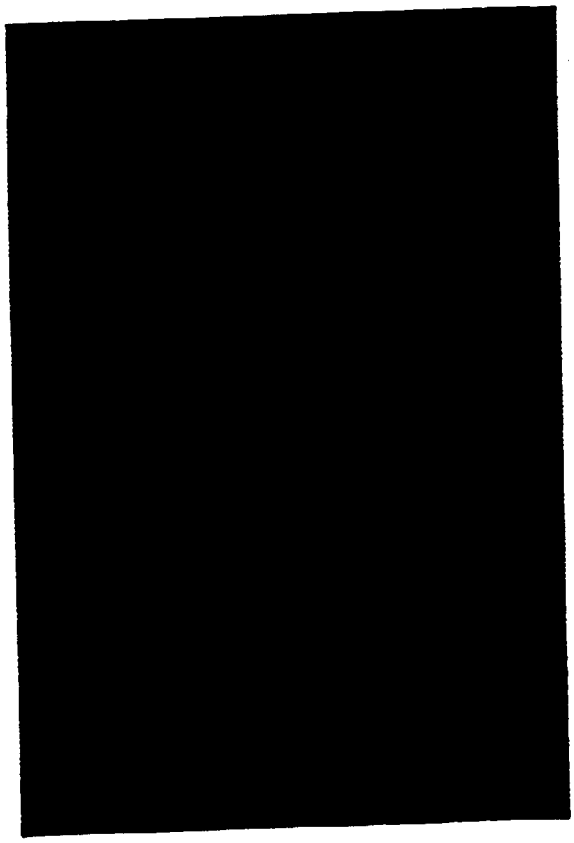
FIG. 20 shows a polarized microscopic image for a White-Taylor GH device with 1 wt % CLCC.

FIG. 20 shows a microphotograph of a morphology of the device under a polarizing microscope without bias. The structure was found similar to the structure of the cholesteric texture cells except that dye molecules darken the field view.

Figure 21:
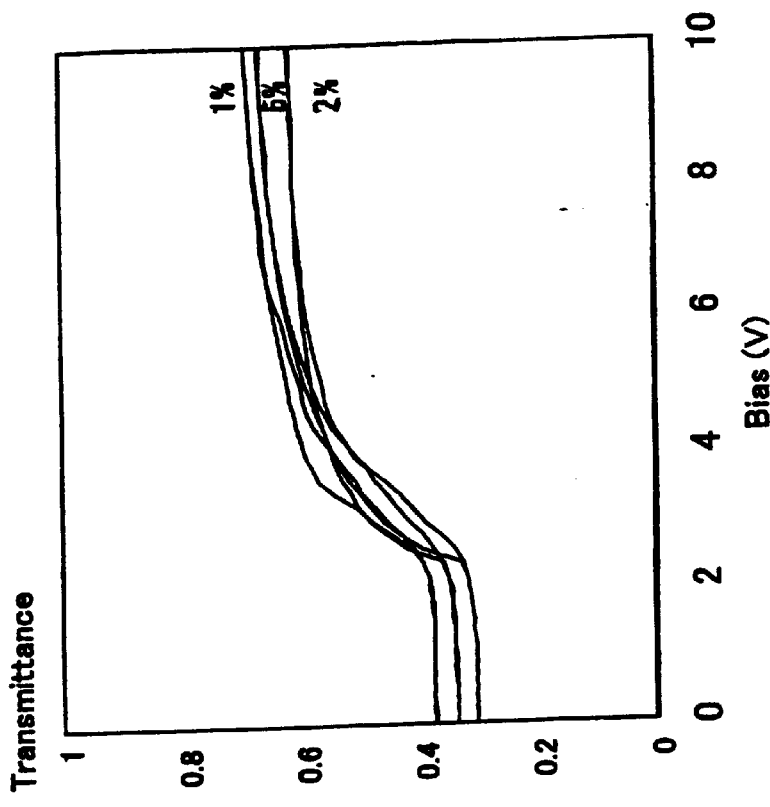
FIG. 21 shows a transmittance vs. voltage characteristics for a White-Taylor GH devices with different CLCC densities.
Figure 22:
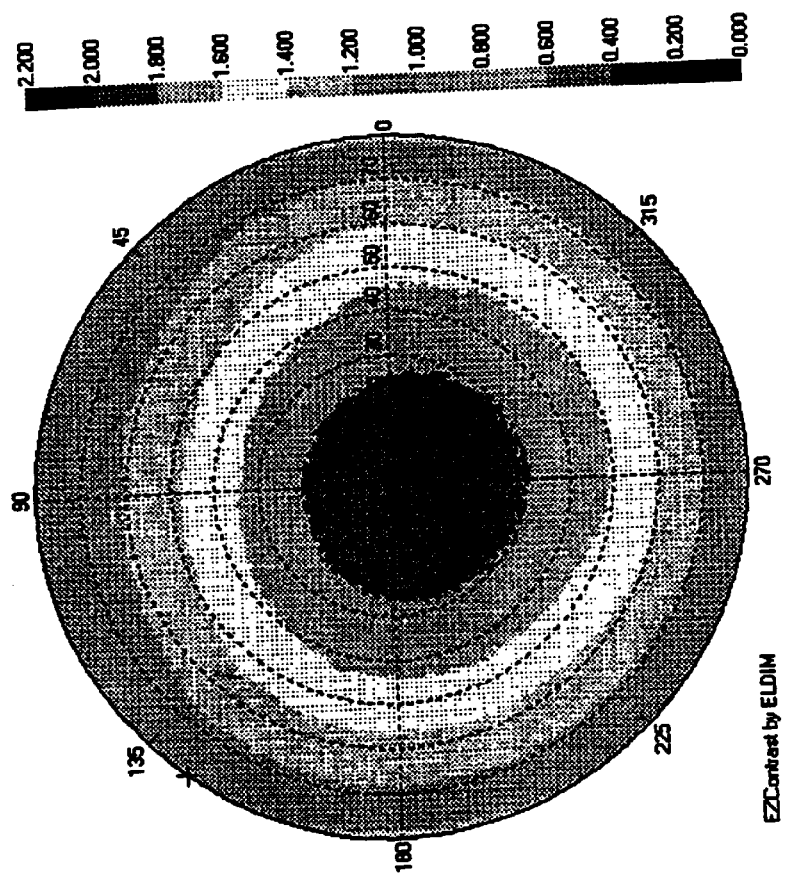
FIG. 22 shows a viewing angle characteristics for a White-Taylor GH device with 1 wt % CLCC.

FIG. 21 shows the transmittance vs. voltage curves for different colloidal particle concentrations from 1% to 5% of the collidal particles. As shown in FIG. 21, the device according to the present invention exhibits transparent and dark states from the lower bias to the higher bias and also shows sufficiently good gray scale characteristics in the middle range from about 2 V to about 6V. The viewing angle characteristics is also significantly symmetric and wide, as shown in FIG. 22.

As described above according to the present invention, an unusual combination of mechanical strength and optical activity make CLCCs useful for novel device applications as innovations or improvements in display devices and electro-optical devices.

While the present invention has been described using the particular application to the display device, the present invention also equally includes an electro-optical device and a method for forming the same.

According to the present invention, the liquid crystal display device and the electro-optical device for transmission or reflection having controlled polydomain microstructures may be provided.

Further, according to the present invention, the liquid crystal display device and the electro-optical device may be provided, in which such devices reduce the angle-dependence of the display's viewing angle for major device types including at least twisted-nematic, parallel nematic, super-twisted-nematic, cholesteric and White-Taylor architectures Further, according to the present invention, no additional processing steps are required in fabrication of the liquid crystal display device and the electro-optical device.

Further, according to the present invention, the liquid crystal display device and the electro-optical device make it possible to control hysteresis in electro-optical switching.

The liquid crystal device and the electro-optical device according to the present invention has a wide range of applications, such as for example, computer display screens, wristwatches, architectural windows, privacy windows, automobile windows, automobile sunroofs, switching devices for optical systems, projection display devices, reflective display devices, hand-held paging devices, cellular phones, laptop computers, television screens including car-mounted television screens, automotive displays including radio, dashboard, and on-board navigation systems, helmet displays such as "heads-up" displays, cockpit displays, imaging devices, virtual reality devices, simulation devices, electronic gating devices, diffraction gratings, calculators, optical shutters, and optical switching devices.

While the invention has been described in terms of several preferred embodiments, those skilled in the art will recognize that the invention can be practiced with modification within the spirit and scope of the appended claims.

Having thus described our invention, what we claim as new and desire to secure by Letters Patent is as follows:

1. A display device, comprising:
    substrates facing each other and each having an electrode, said substrates being spaced apart;
    spacers disposed between said substrates and defining an electro-optical cell together with said substrates; and
    a colloidal liquid crystal composite (CLCC) provided in said electro-optical cell, said comprising particle-rich inter-domain regions and micro-domains of a liquid crystal,
    said particle-rich inter-domain regions comprising colloidal organic particles being networked in said liquid crystal,
    wherein aggregated one of said colloidal organic particles of said CLCC form a network boundary around said micro-domains of said liquid crystal.

2. The display device according to claim 1, wherein said colloidal organic particles comprise sterically-stabilized polymer particles.

3. The display device according to claim 2, wherein said substrates have homogenous alignments so that said liquid crystal of said CLCC are aligned with each other.

4. The display device according to claim 2, wherein each of said substrates is applied with an alignment so that said CLCC forms a predetermined twisted-nematic configuration.

5. The display device according to claim 4, wherein each of said substrates is applied with an alignment so that said CLCC forms 90±20 degrees twisted-nematic configuration.

6. The display device according to claim 2, wherein said substrates are treated to provide an alignment with a randomly distributed direction such that said CLCC forms a polydomain structure and said liquid crystal is mixed with a chiral compound so as to provide a 90±20 degree twisted alignment between said substrates.

7. The display device according to claim 2, wherein said liquid crystal comprises cholesteric liquid crystals so that the product of the helical pitch and an average reflective index of the liquid crystal is selectively within a wavelength range of visible light.

8. The display device according to claim 2, wherein said liquid crystal is mixed with a dye Compound or a chiral compound so as to provide a twisted alignment having 180 ~360 degrees between said substrates.

9. The display device according to claim 1, wherein said substrates are treated to provide an alignment with a randomly distributed direction such that said CLCC forms a polydomain structure and said liquid crystal is mixed with a chiral compound so as to provide a 90±20 degree twisted alignment between said substrates.

10. The display device according to claim 1, wherein said substrates have homogenous alignments so that said liquid crystal of said CLCC are aligned with each other.

11. The display device according to claim 1, wherein said liquid crystal comprises a cholesteric liquid crystal so that the product of a helical pitch and an average reflective index of said liquid crystal is selectively within a wavelength range of visible light.

12. The display device according to claim 1, wherein each of said substrates is applied with an alignment so that said CLCC forms a predetermined twisted-nematic configuration.

13. The display device according to claim 12, wherein each of said substrates is applied with an alignment so that said CLCC forms 90±20 degrees twisted-nematic configuration.

14. The display device according to claim 1, wherein said liquid crystal is mixed with a dye compound or a chiral compound so as to provide a twisted alignment having 180~360 degrees between said substrates.

15. The display device according to claim 1, wherein said colloidal organic particles comprise colloidal polymer particles synthesized from a polymerizable monomer selected from the group consisting of acrylic acid, methacrylic acid, methyl (metha) acrylate, ethyl (metha) acrylate, hydroxyethyl (metha) acrylate, propyl (metha) acrylate, iso-propyl (metha) acrylate, hydroxy propyl (metha) acrylate, buthyl (metha) acrylate, hexyl (metha) acrylate, 2-ethyl-hexyl (metha) acrylate, stylene, divinyl benzene, vinyl toluene, vinyl ethers, vinyl halides, vinylidene halides, and mixtures thereof.

16. The display device according to claim 15, wherein said colloidal organic particles are sterically-stabilized by one of a dispersant and an emulsifier selected from the group consisting of anionic surfactants, cationic surfactants, amphoteric surfactants, non-ionic surfactants, polymeric surfactants selectively including poly(alkylene) oxide and derivatives thereof, polyesters selectively including poly-12-hydroxystearic acid (12HSA), and mixtures thereof.

17. The display device according to claim 1, wherein said colloidal organic particles comprise colloidal PMMA particles sterically-stabilized with poly-12-hydroxystearic acid (12HSA).

18. The display device according to claim 17, wherein said poly-12-hydroxystearic acid (12HSA) is grafted to surfaces of said PMMA particles.

19. The display device according to claim 1, wherein said colloidal organic particles form a random network such that said micro-domains are filled with said liquid crystal, and
wherein said particle-rich inter-domain regions further comprise colloidal inorganic particles.

20. The display device according to claim 1, wherein said colloidal organic particles form a random network such that said micro-domains are filled with said liquid crystal, and
wherein a size of said network boundary is controlled by a colloidal particle concentration.

21. A method of forming a liquid crystal microstructure, comprising:
providing colloidal organ c particles; and
mixing said colloidal organic particles with a liquid crystal so as to form micro-domains under a condition that said colloidal particles are introduced in an isotropic phase of said liquid crystal;
wherein aggregated ones of said colloidal organic particles from a network boundary around said micro-domains of a liquid crystal.

22. The method according to claim 21, wherein said colloidal organic particles comprise sterically-stabilized PMMA particles with poly-12-hydroxystearic acid (12HSA).

23. The method according to claim 22, wherein said poly-12-hydroxystearic acid (12HSA) is grafted to surfaces of said PMMA particles.

24. The method according to claim 21, wherein said mixing further includes heating said liquid crystal above a clearing temperature thereof.

25. The method according to claim 24, wherein said heating is continued until said colloidal organic particles and said liquid crystal are mixed to form said micro-domains.

26. The meted according to claim 21, wherein said micro-domains provide a colloidal liquid crystal composite (CLCC) used to form a display device, said display device comprising:
substrates facing each other and each having an electrode, said substrates being spaced apart;
spacers disposed between aid substrates and defining an electrical-optical cell together with said substrates;
wherein said CLCC is provided in said electro-optical cell, said CLCC comprising particle-rich inter-domain regions and micro-domains of a liquid crystal, said particle-rich inter-domain regions comprising colloidal organic particles being networked in said liquid crystal.

27. The method according to claim 21, wherein said colloidal organic particles comprise colloidal polymer particles synthesized from a polymerizable monomer selected from the group consisting of acrylic acid, methacrylic acid, methyl (metha) acrylate ethyl (metha) acrylate, hydroxy-ethyl (metha) acrylate, propyl (metha) acrylate, iso-propyl (metha) acrylate, hydroxy propyl (metha) acrylate, buthyl (metha) acrylate, hexyl (metha) acrylate, 2-ethyl-hexyl (metha) acrylate, stylene, divinyl benzene, vinyl toluene, vinyl ethers, vinyl halides vinylidene halides, and mixtures thereof.

28. The method according to claim 27, wherein said colloidal organic particles are sterically-stabilized by one of a dispersant and an emulsifier selected from the group consisting of anionic surfactants, cationic surfactants, amphoteric surfactants, non-ionic surfactants, polimeric surfactants selectively including poly(alkylene) oxide and derivatives thereof, polyesters selectively including poly-12-hydroxystearic acid (12HSA), and mixtures thereof.

29. The method according to claim 21, wherein said colloidal organic particles form a random network such that said micro-domains are filled with said liquid crystal, and said method further comprises:
cooling said colloidal particles across an isotropic-nematic transition phase.

30. An electro-optic device, comprising:
substrates facing each other and each having an electrode, said substrates being spaced apart;
an optical cell fanned between said substrate;
a colloidal liquid crystal composite (CLCC) formed in said optical cell, said CLCC comprising particle-rich inter-domain regions and micro-domains of a liquid crystal, said particle-rich inter-domain regions comprising colloidal organic particles being networked in said liquid crystal;
wherein ones of said colloidal organic particles of said CLCC form a network boundary around said ore-domains of said liquid crystal.

31. The electro-optical device according to claim 30, wherein said colloidal organic particles comprise colloidal polymer particles synthesized from a polymerizable monomer selected from the group consisting of acrylic acid, methacrylic acid, methyl (metha) acrylate, ethyl (metha) acrylate, hydroxy-ethyl(metha) acrylate, propyl (metha) acrylate, iso-propyl (metha)acrylate, hydroxy propyl (metha) acrylate, buthyl (metha) acrylate, hexyl (metha) acrylate, 2-ethyl-hexyl (metha) acrylate, stylene, divinyl benzene, vinyl toluene, vinyl ethers, vinyl halides, vinylidene halides, and mixtures thereof.

32. The electro-optical device according to claim 31, wherein said colloidal organic particles are sterically-stabilized by one of a dispersant and an emulsifier selected from the group consisting of anionic surfactants, cationic surfactants, amphoteric surfactants, non-ionic surfactants, polimeric surfactants selectively including poly(alkylene) oxide and derivatives thereof, polyesters selectively including poly-12-hydroxystearic acid (12HSA), and mixtures thereof.

33. The method according to claim 30, wherein said colloidal organic particles comprise sterically-stabilized PMMA particles with poly-12-hydroxystearic acid (12HSA).

34. A method of forming an electro-optical device, comprising;
providing substrates facing each other and each having an electrode, said substrates being spaced apart;
defining an optical cell between said substrate; and
introducing a colloidal liquid crystal composite (CLCC) filled in said optical cell, said CLCC comprising particle-rich inter-domain regions and micro-domains of a liquid crystal, said particle-rich inter-domain regions comprising colloidal organic particles being networked in said liquid crystal;
wherein aggregated ones of said colloidal organic particles of said CLCC form a network boundary around said ml a-domains of said liquid crystal.

35. The method according to claim 34, wherein said colloidal organic particles comprise colloidal polymer particles synthesized from a polymerizable monomer selected from the group consisting of acrylic acid, methacrylic acid, methyl (metha) acrylate, ethyl (metha) acrylate, hydroxyethyl (metha) acrylate, propyl (metha) acrylate, iso-propyl (metha) acrylate, hydroxy propyl (metha) acrylate, buthyl (metha) acrylate, hexyl (metha) acrylate, 2-ethyl-hexyl (metha) acrylate, stylene, divinyl benzene, vinyl toluene, vinyl ethers, vinyl halides, vinylidene halides, and mixtures thereof.

36. The method according to claim 35, wherein said colloidal organic particles are sterically-stabilized by one of a dispersant and an emulsifier selected from the group consisting of anionic surfactants, cationic surfactants, amphoteric surfactants, non-ionic surfactants, polymeric surfactants selectively including poly(alkylene) oxide and derivatives thereof, polyesters selectively including poly-12-hydroxystearic acid (12HSA) and mixtures thereof.

37. The method according to claim 34, wherein said colloidal organic particles comprise sterically-stabilized PMMA particles with poly-12-hydroxystearic acid (12HSA).

38. The method according to claim 34, wherein said colloidal organic particles four a random network such that said micro-domains are filled with said liquid crystal, and said method further comprises:

cooling said colloidal organic particles acoss an isotropic-nematic transition phase.

* * * * *